Oct. 4, 1955

D. C. ROCKOLA 2,719,720

PHONOGRAPHS

Filed Nov. 29, 1946

10 Sheets-Sheet 1

INVENTOR.
David C. Rockola
by
Sheridan, Davis & Cargill
Attorneys

PHONOGRAPHS

Filed Nov. 29, 1946 10 Sheets-Sheet 2

INVENTOR.
David C. Rockola
BY
Sheridan, Davis & Cargill
Attorneys

INVENTOR.
David C. Rockola
BY
Sheridan, Davis & Cargill
Attorneys

INVENTOR.
David C. Rockola
BY
Sheridan, Davis & Cargill
Attorneys

INVENTOR.
David C. Rockola
BY
Sheridan, Davis & Cargill
Attorneys

PHONOGRAPHS

Filed Nov. 29, 1946

10 Sheets-Sheet 6

INVENTOR.
David C. Rockola
BY
Sheridan, Davis & Cargill
Attorneys

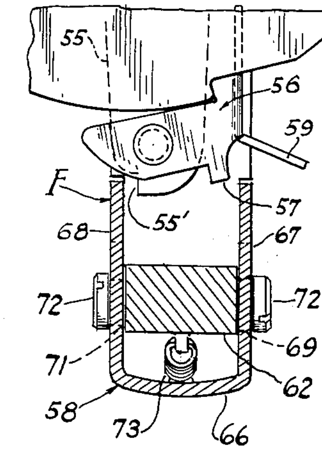
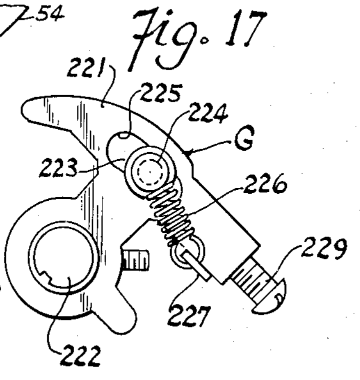
Fig. 17
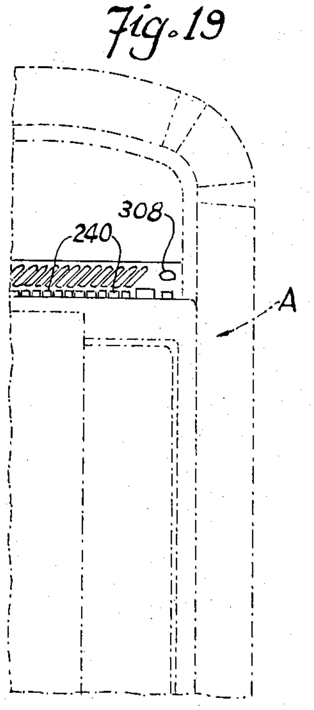
Fig. 19
Fig. 18
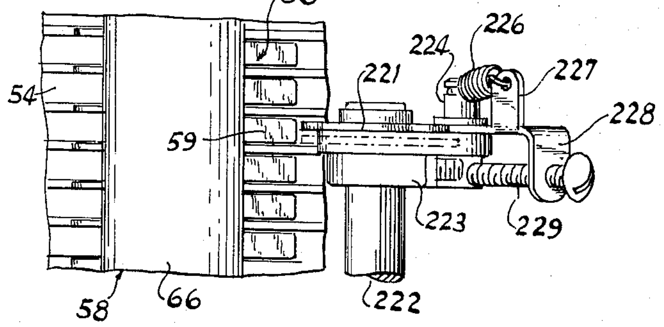
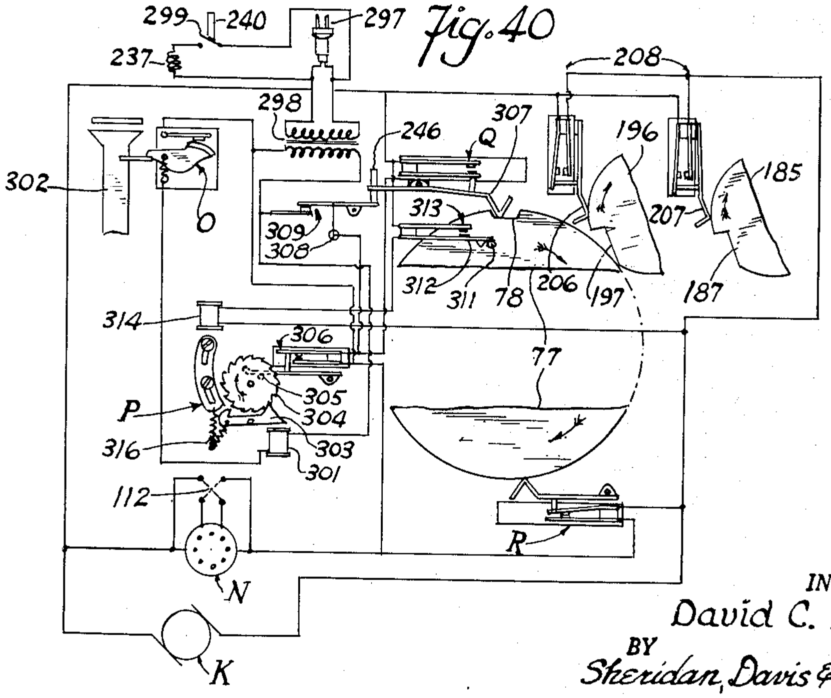
Fig. 40
INVENTOR.
David C. Rockola
BY
Sheridan, Davis & Cargill
Attorneys INVENTOR.
David C. Rockola
BY
Sheridan, Davis & Cargill
Attorneys INVENTOR.
David C. Rockola
BY
Sheridan, Davis & Cargill
Attorneys

PHONOGRAPHS

Filed Nov. 29, 1946 10 Sheets-Sheet 10

INVENTOR.
David C. Rockola
BY
Sheridan, Davis & Cargill
Attorneys

United States Patent Office 2,719,720
Patented Oct. 4, 1955

2,719,720

PHONOGRAPHS

David C. Rockola, Chicago, Ill., assignor, by mesne assignments, to Rock-Ola Manufacturing Corporation, Chicago, Ill., a corporation of Delaware Application November 29, 1946, Serial No. 713,045

7 Claims. (Cl. 274—10)

This invention relates in general to phonographs, and more particularly to automatic multi-record phonographs capable of playing numbers of records selectively.

A principal object of the invention is the provision of such a phonograph which is capable of selectively playing either or both sound recordings on the obverse and reverse sides of one, some, or all of a plurality of disc records, without reversing or turning over the records.

Another important object of the invention is the provision of an automatic phonograph having means for storing a plurality of disc records which have sound recordings on both sides thereof, record player means including record reproducer or tracer means comprising two tone arms and record support means rotatable in one direction when one tone arm is employed to play the recording on the obverse side of a record and in the opposite direction when the other tone arm is used to play a recording on the reverse side of a record, selector means for determining which of said records is to be played and the order of their playing, record changer means for moving the records from the record storage means to the record support means under the control of the selector means and back to the record storage means after playing, and predetermining means for controlling operation of the selector means and automatically determining, in the case of each recording, the direction of rotation of the record support means and which tone arm is to be employed for playing the same in accordance with whether such recording is on the obverse or reverse side of a record.

A further object of the invention is the provision in a phonograph of novel record player means comprising a pair of oppositely disposed and normally inoperative tone arms for respectively reproducing recordings on the opposite sides of disc records, and novel control means for selectively rendering the tone arms operative.

Another object of the invention is to provide novel selectively operable predetermining means in an automatic phonograph for predetermining the playing of either or both sound recordings on opposite sides of one or each of any number of a plurality of disc records.

A further object of the invention is the provision in a coin-controlled, multi-record automatic phonograph, having coin receiving means and selectively operable means for selecting the records therein for playing, of novel control means for preventing operation of the phonograph until a coin or coins have been deposited in the coin receiving means and one or more selections have been made.

Another object of the invention is the provision in such a phonograph of indicator or signal means automatically operable, when a coin or coins have been deposited without having made a record selection, to remind the person operating the machine to make a selection.

Numerous other objects and advantages of the invention will be apparent as it is better understood from the following description, which, when taken in connection with the accompanying drawings, discloses a preferred embodiment thereof.

In the drawings:

Fig. 17 is a detail plan view showing part of the selector mechanism for operating a record carrier latching means, with the record changer means in horizontal section;

Fig. 18 is a front elevational view of the mechanism of Fig. 17;

Fig. 19 is a partial front elevation of a phonograph embodying the instant invention;

Figures 20, 21, 22, 23, 24, 25, 26:
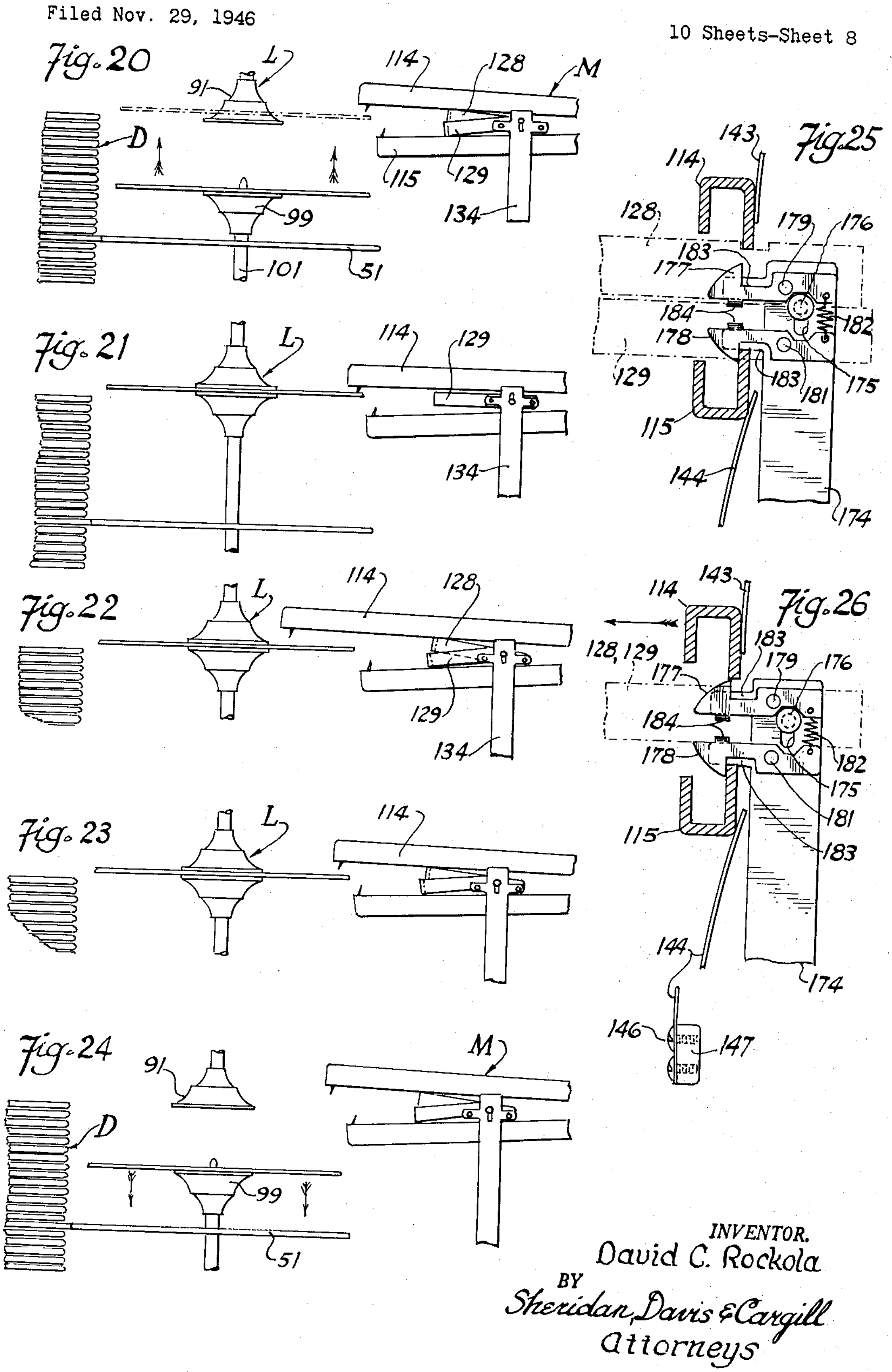
Figures 27, 28, 29, 30, 31, 32, 33:
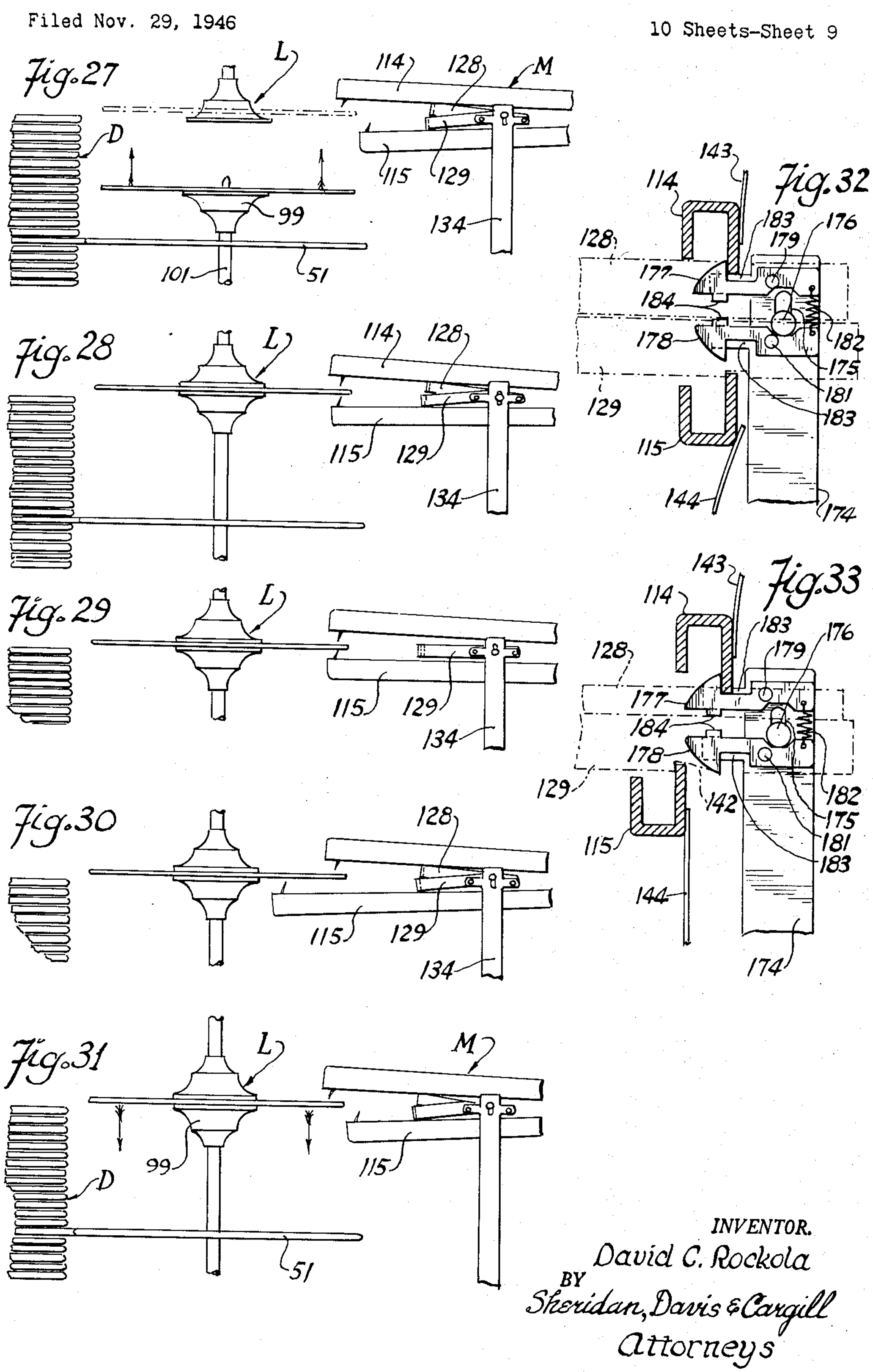
Figure 34:
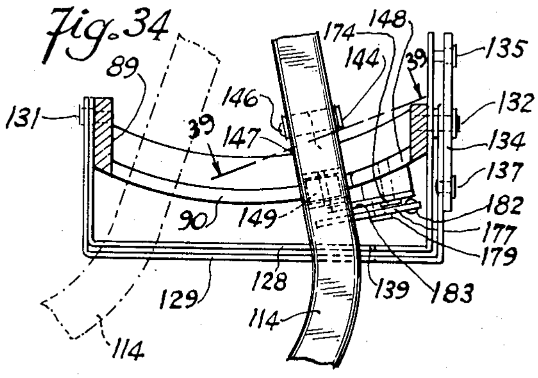
Figure 36:
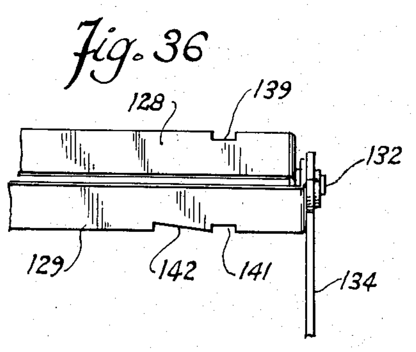
Figure 35:
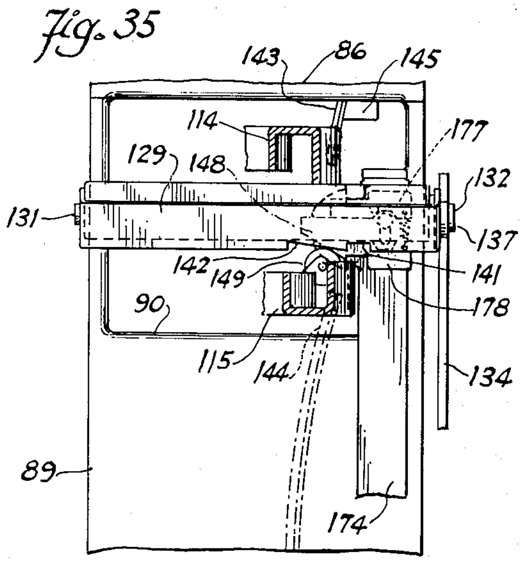
Figure 37:
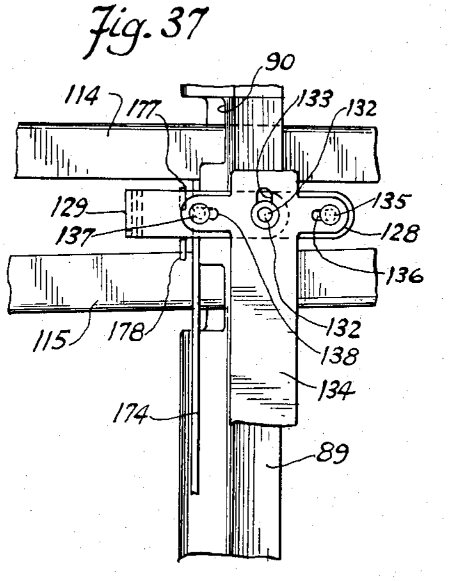
Figure 38:
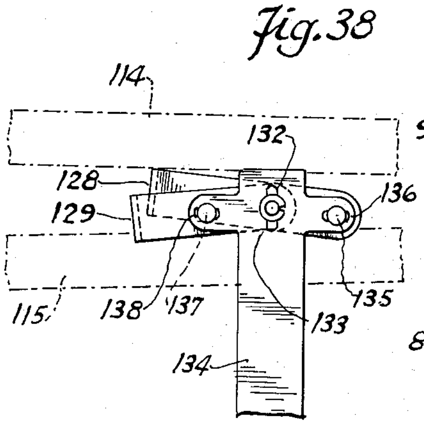
Figure 39:
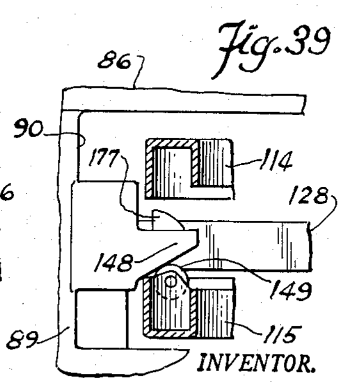

Figs. 20 to 24, inclusive, are diagrammatic elevational views of the record reproducer means in different positions throughout a cycle of operation of the upper tone arm;

Figs. 25 and 26 are detail vertical sections of the reproducer control means during different parts of the cycle represented by Figs. 20 to 24;

Figs. 27 to 31, inclusive, are diagrammatic elevational views of the record reproducer means in different positions throughout a cycle of operation of the lower tone arm;

Figs. 32 and 33 are views similar to Figs. 25 and 26 for different positions of the reproducer control means corresponding to the cycle represented in Figs. 27 to 31;

Fig. 34 is a detail horizontal section showing the reproducer control means in plan;

Fig. 35 is a vertical elevation, as seen from the front of Fig. 34, showing the scissors mechanism in intermediate position;

Fig. 36 is a detail front elevation of the scissors mechanism of the record reproducer means in open position;

Fig. 37 is a detail elevation as seen from the right of Figs. 34 to 36, showing the scissors mechanism in closed position;

Fig. 38 is a view similar to Fig. 37 showing the scissors mechanism in intermediate position;

Fig. 39 is a detail vertical section taken substantially along the line 39—39 of Fig. 34; and Fig. 40 is a schematic wiring diagram of an electric circuit for the machine herein disclosed.

The instant invention is shown in the accompanying drawings for illustrative purposes as being embodied in an automatic multi-record phonograph of novel construction. Generally considered, that phonograph comprises in operative relationship multi-record-storage, record-player, record-changer, selector, driving, and control means. According to the present invention the novel phonograph is operable to predetermine either or both sound recordings of one or each of any plurality of the disc records in the storage means and, without turning over any of those records, automatically to select and play the predetermined recording or, if more than one are predetermined, each of them one at a time, whether all of the predetermined recordings are on the corresponding faces of the respective records bearing the predetermined recordings, or some are on corresponding faces of some or all of those records and at least one is on the non-corresponding face or the face opposite the corresponding face of one of the records.

Figures 8, 9:
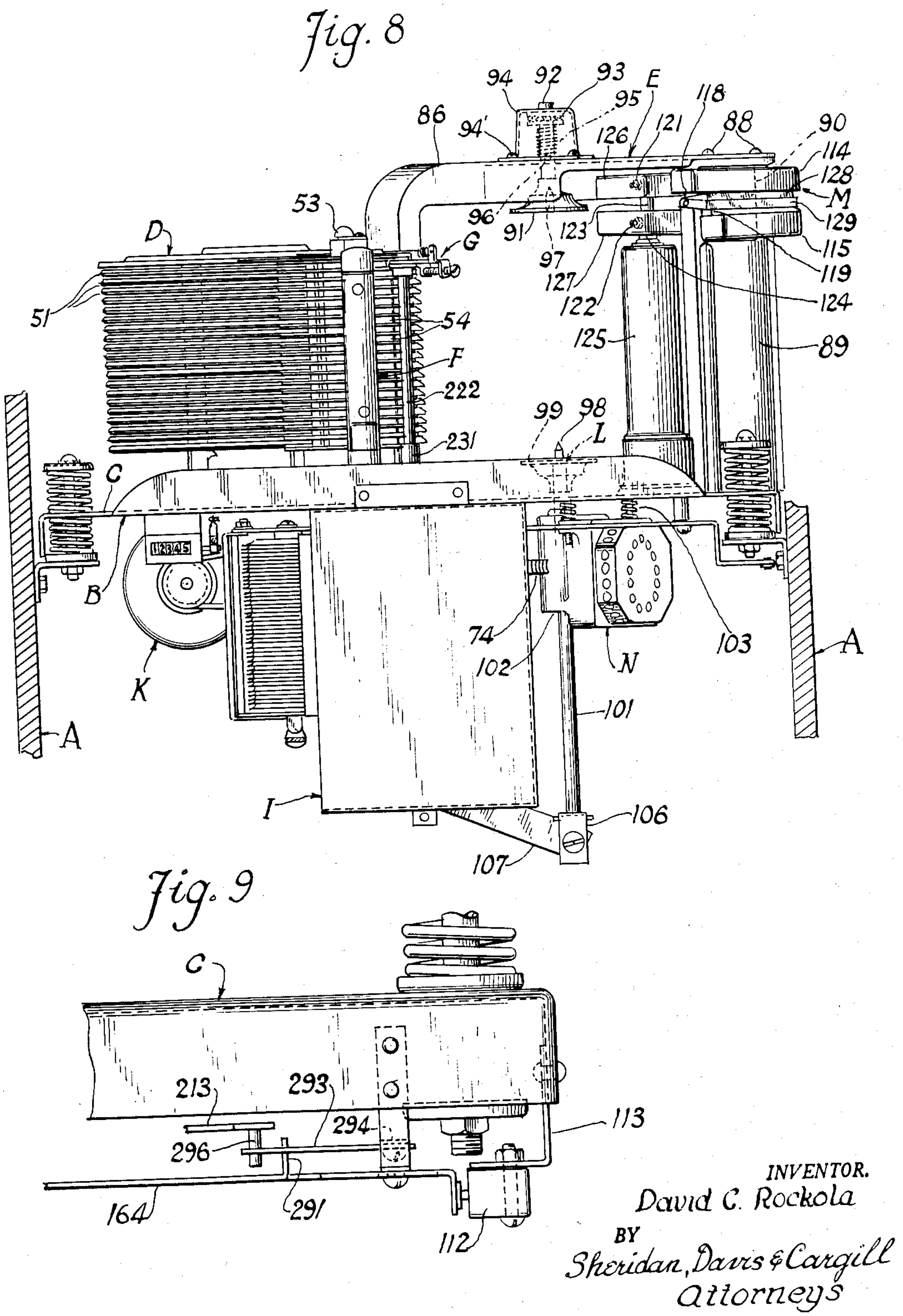
Fig. 8 is an elevational view of the operating mechanism as seen from the front of the machine.
Fig. 9 is a detail side elevation of the rear end of the reproducer predetermining means.

The illustrated phonograph comprises a suitable cabinet A of any desired construction (Fig. 19), which forms no part of the invention and therefore is not shown herein in detail. Fig. 8 shows a fragment of each of two walls of the casing A for accommodating a chassis or frame B and, if desired, usual amplifier and speaker means, not shown. It will be understood by those skilled in this art that the record-player, amplifier, and speaker means cooperate to translate the irregularities recorded in the sound tracks of disc records into mechanical vibrations, to convert those mechanical vibrations into electrical impulses, to amplify those electrical impulses, and to convert them into sound corresponding to the irregularities recorded in the sound tracks.

The chassis B is mounted in the casing as shown in Fig. 8 and includes a mounting panel C, sometimes called a motor board, and is adapted to serve as mounting means for the record-storage, record-player, record-changer, selector, driving, and control means of the phonograph. That chassis carries the record-storage, record-player, record-changer, and selector means, all extending above the mounting panel and now designated by the general reference characters D, E, F, and G, respectively, and below the mounting panel the driving means, now designated by the general reference character H, parts of the selector means G, and certain of the control means including predetermining or selector control means I.

As illustrated herein, the record storage means D is substantially identical to that fully shown and described in United States Letters Patents No. 2,159,833, and No. 2,159,834, both issued May 23, 1939, No. 2,347,995, issued May 2, 1944, and No. 2,389,327, issued November 20, 1945, and in my copending United States Letters Patent applications, Serial No. 553,161, filed September 5, 1944, and Serial No. 701,365, filed October 4, 1946. It is therefore unnecessary to repeat herein the detailed disclosure of such record storage means.

It might be well, however, by way of explanation, to point out that the storage means D is adapted individually to support a plurality of disc records of usual or desired construction. For that purpose, the illustrated storage means comprises a plurality of record carriers 51. Each of the record carriers is of ring-shaped or equivalent configuration and is adapted to support a disc record at its peripheral margin. The record carriers 51 are each provided with an outwardly extending arm 52 (Fig. 1) for mounting them in stacked or column relationship, and as illustrated, the carriers are pivotally mounted on a post 53 between successive discs 54 (Fig. 8) fixed in column relation on the post 53. The arm 52 of each record carrier has a portion 55 (Fig. 17) extending beyond the pivot post 53 for pivotally carrying a latch member 56 and having at its outer end a shoulder 55'. The latch members 56 interlockingly and releasably engage with respectively adjacent discs 54 for releasably latching the record carriers in column or stack relationship at one side of the record-player means E, as disclosed in detail in my said copending application Serial No. 701,365. Each latch member 56 is provided with a finger 57 engageable with record carrier moving means 58 constituting a part of the record-changer means F, and with a finger 59 operable by the selector means G for releasing the corresponding record carrier and drivingly coupling it with the record carrier moving means 58.

The purpose of the record carrier moving means 58 is to move one record carrier 51 at a time from its column or stack position to cooperative relationship with the record-player means E (Fig. 1) for delivery thereby of the record to playing position and, after playing of the record, and its return by the record-player means to the record carrier, to return the record carrier bearing the played record to its stack or column position. For that purpose the record carrier moving means disclosed in the above-mentioned patents has been satisfactory, but I prefer to employ the improved record carrier moving means shown in Figs. 1, 10, and 17 herein, and described in detail in said application Serial No. 701,365. This record carrier moving means 58 comprises a yoke-like structure having an arm portion or member 61 pivoted on the post 53 at the upper end thereof and extending radially outwardly therefrom, above the column of discs 54 and beyond the peripheries of those discs; a portion or member 62 depending from the outer end of the arm portion 61 downwardly, alongside and outwardly of the column of discs 54; an offset portion or member 63 beyond the lower end of the column of discs 54 and extending from the portion 62 inwardly toward the pivot post 53; and a connecting portion or member having a leg 64 connected to the inner end of the offset portion 63 and extending therefrom through an appropriately located and shaped aperture in the mounting panel C, and a leg 65 connected at one end to the leg 64 and extending therefrom to the pivot post 53 upon which it is rotatably mounted. Like the yoke-like structure disclosed in the above-mentioned patents, the leg 65 herein constitutes a part of suitable coupling means, not completely shown herein, for coupling the yoke-like structure to a rotatable master cam J constituting a part of the driving means H under the mounting panel C, and adapted to swing the record carrier moving means in the directions for moving any record carrier latched thereto to and from cooperative relationship with the record-player means E.

Instead of providing the portion 62 of the yoke-like structure of channel-shape, as in the aforesaid patents, it is of rectangular shape herein (Figs. 10 and 17) and is embraced by a channel member 66 having spaced, parallel leg or face members 67 and 68 arranged along and at opposite sides of the portion 62. These legs or face members 67 and 68 are provided with an inclined, elongated aperture 69 and 71, respectively, through each of which extends a bolt or other suitable securing means 72 anchored in the portion 62 for securing the channel member 66 to the portion 62 of the yoke-like structure. A suitable spring 73 anchored at one end to the portion 62 and at its opposite end to the channel member 66 yieldably holds the latter in such position that its leg or face member 67 is cooperable with the member 57 of any operated latch member 56 for swinging the corresponding record carrier out of stack position and to cooperative relationship with the record-player means E, and that its other leg or face member 68 is cooperable with the shoulder 55' of any record carrier in cooperative relationship with the record-player means for swinging the corresponding record carrier back to stack or column position.

By pulling the channel member 66 downwardly away from the portion 62 of the record carrier moving means 58, against the action of the spring 73, the leg or face members 67 and 68 of the channel member are moved out of the path of movement of the record carrier arm portions 55, the shoulders 55' thereof, and the latch members 56. By holding the channel member 66 in that position, any one or more of the record carriers are manually swingable from and to stack or column position to facilitate removal and replacement of records in the record-storage means D. Upon release of the channel member 66, the spring 73 returns it to its normal, record-carrier engageable position, shown in Fig. 17.

As already mentioned, the driving means H includes the master cam J which is substantially identical to the master cam fully shown and described in the last three of the above mentioned patents. As therein fully disclosed, the master cam J comprises an upper member or worm wheel 74 (Figs. 3 and 10) having a cam groove, not shown, in its upper face for operating the record carrier moving means 58, as already described, and an upstanding pin or stud 75 for cyclically operating the selector means G; cam means 76 coaxial with and below the worm wheel 74 and formed by rails arranged at and along a barrel-like or cylindrical projection of the worm wheel for operating the selector means G and for causing the record-player means E to cooperate with the record carrier moving means 58 in moving records between stack and playing positions, as already described, and a cam disc 77 having a notch 78 (Fig. 40) in its periphery. These members are fixed on and are rotatable as a unit with a shaft 79 journaled in spaced frame members of the chassis B, the lower of which is shown at 81 in Figs. 3 and 10.

Figures 3, 4, 5, 6, 7:
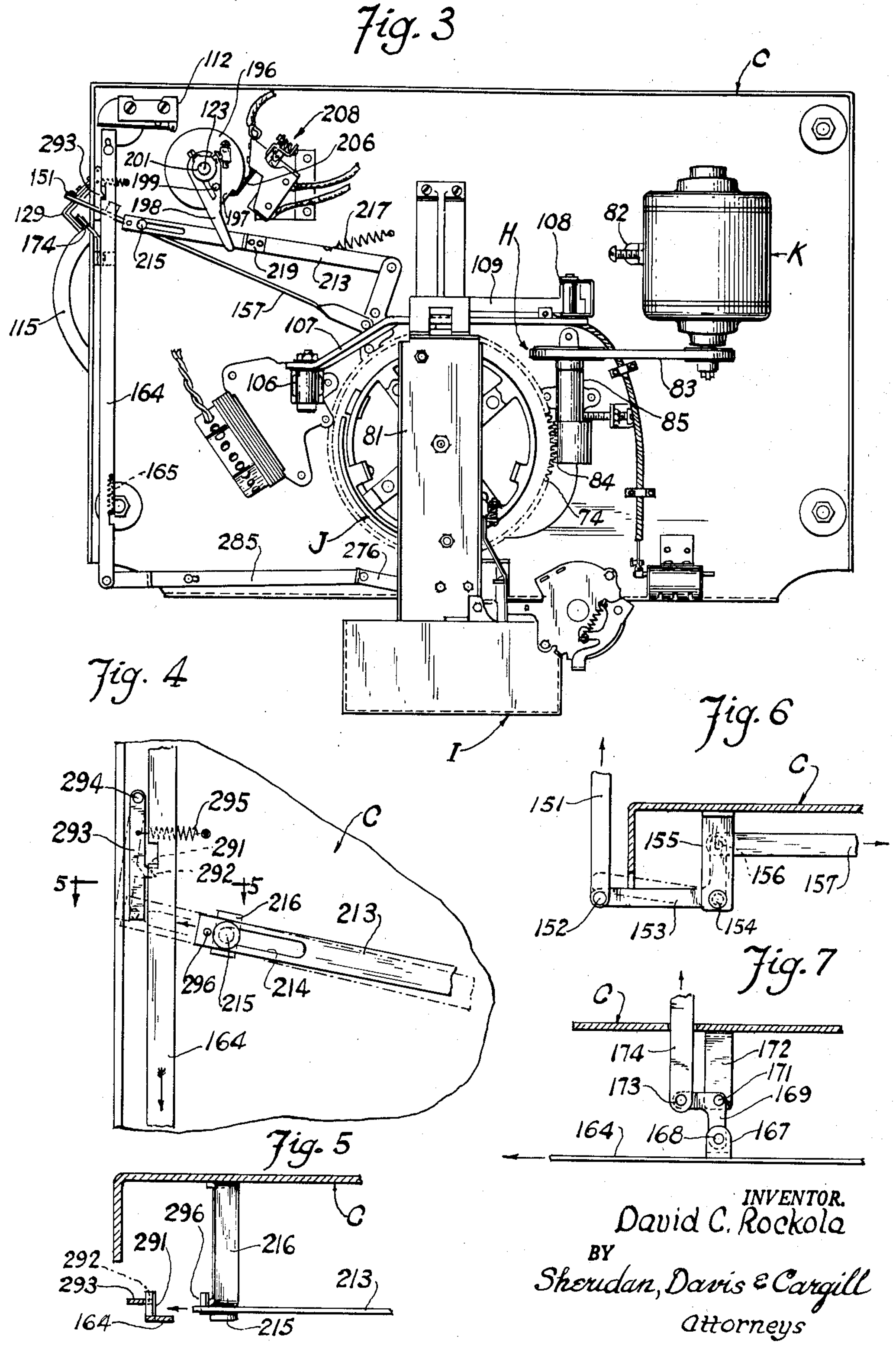
Fig. 3 is a bottom plan view of the operating mechanism of Fig. 1.
Fig. 4 is an enlarged detail bottom plan of the latching mechanism for the record reproducer pre-selecting means.
Fig. 5 is a detail section taken substantially along the line 5—5 of Fig. 4.
Figs. 6 and 7 are detail vertical sections of the mounting arrangement of the scissors mechanism and predetermining means, respectively, of the record reproducer means.

For rotating the master cam J, a suitable electric motor K, secured as indicated at 82 in Fig. 3 to the lower face of the mounting panel C, is provided with suitable drive connections, such as a belt-and-pulley coupling 83, to a worm gear 84 journaled in a bearing 85 on the lower face of the mounting panel, and meshing with the worm wheel 74.

The novel record-player means E (Figs. 1, 8 and 10) comprises playing-record support means L and record reproducer or tracer means M arranged and supported on the mounting panel C at one side of the record-storage means D, and is adapted not only to play the records, but also to cooperate with the record-carrier moving means 58 in moving records between the storage means D and the record playing position for playing and changing the records.

For cooperating with the record-carriers 51 and the record carrier moving means 58 to change records and so to support and rotate each record in the playing position that either of its recordings is reproducible, the playing record support means L is a novel structure. That novel structure comprises a mounting bracket or frame member 86 which at one end is suitably secured as at 87 on the column of discs 54 and which extends upwardly therefrom and then laterally to supporting engagement at its other end and is secured as at 88 on a standard or bracket member 89, in turn secured on and extending upwardly from the mounting panel C and having a bifurcated upper end to provide a recess or opening 90 therein (Figs. 8 and 35).

Intermediate its ends, the mounting bracket member 86 carries a record clamping disc 91 forming a part of the record support means L fixed on the lower end of a depending stub shaft 92 which is rotatably and reciprocably journaled in a suitable bearing 93 on the bracket member 86. The bearing 93 and the upper end of the shaft 92 are enclosed in a suitable housing 94 secured as at 94' on the bracket member 86 and enclosing a spring 95 coiled about the shaft between the bearing 93 and a pin or other projection 96 on the shaft below the bearing and above the bracket member. The spring 95 urges the shaft and record clamping disc 91 downwardly so that the pin 96 yieldably engages on the bracket member 86, thus normally disposing the clamping disc 91 slightly below the record playing position. Upon proper upward pressure against the lower face of the clamping disc, the spring 95 yields and permits upward movement of the clamping disc to the playing position.

The clamping disc 91 is preferably circular in shape with a diameter equal to or less than that of the central portion of a disc record inwardly of the sound track and usually covered by a label bearing the title and other information relative to the recording at each face of the record. At its center, the clamping disc is provided with a depression or recess 97 (Fig. 8) extending axially inwardly of the lower face of the disc of a diameter and length to receive a center pin 98 of another clamping disc 99 hereinafter, because of one of its functions, sometimes called a turntable, of substantially the same size and shape as the disc 91.

The turntable 99, also forming part of the record support means L, is carried above the mounting panel C on the upper end of a shaft 101 which is slidably journaled intermediate its ends in a motor frame 102, so resiliently secured as at 103 below the mounting panel C as to carry the shaft 101 in coaxial alignment with and below the stub shaft 92. The shaft 101 is slidably coupled to a reversible motor N, carried by the motor frame 102, as described in the above mentioned Patent No. 2,159,833, for rotating the shaft 101 to rotate the turntable 99 at a usual velocity for playing records.

At its lower end, the shaft 101 is provided with an enlargement or head 105 which is coupled as at 106 to an end of a lever 107 pivoted at its other end on an upstanding bracket 108 (Fig. 3) projecting upwardly from an arm 109 of the lower frame member 81. Intermediate its ends, the lever 107 carries a cam roller or follower 111 (Fig. 10) which is engageable by the cam means 76 of the master cam J for axially reciprocating the shaft 101 sufficiently to move the turntable 99 between a position below the level of the lowermost record carrier 51 and the playing position, above the uppermost record carrier 51.

In so moving, the turntable 99 is adapted to pass through any record carrier 51 which has been swung, as already described to cooperative relationship with the record-player means E. In moving upwardly with the turntable during such operation, the center pin 98 is adapted to pass through the usual central aperture in the disc record carried by the outswung record carrier 51. Thus, the turntable 99 is brought into engagement with the lower face of that record and is adapted, during further upward movement, to remove it from its record carrier and move it upwardly to bring its upper face against the lower face of the clamping disc 91. The center pin 98 is adapted to enter the recess 97 as the upper face of the record being so moved approaches the clamping disc 91, and thereafter, the final upward movement of the turntable transmitted through the record clamped between it and the disc 91 is adapted to move the clamping disc 91 upwardly against the action of the spring 95 to move the record to its playing position.

In moving downwardly, the turntable 99 removes the record from engagement with the clamping disc 91, the spring 95 returning the disc 91 to its lower position, and to its position on its record carrier 51, which has remained in the outswung position. The turntable thereafter continues its downward movement to the normal inoperative position shown in Figs. 8 and 10.

At the playing position of the record, the turntable 99 is rotatable in either direction to permit playing the recording on either of its opposite faces. For controlling the direction of rotation of the turntable, a motor reversing switch 112 is mounted, as shown in Fig. 9, on a bracket 113 depending from the mounting panel C near the rear margin thereof.

For cooperating with the playing-record support means L just described, to play either of the recordings at the opposite faces of a disc record without turning the record over, the record reproducer or tracer means M comprises a pair of tone arms 114 and 115 (Figs. 1, 8, 10 and 11). The illustrated tone arms are of substantially U-shaped cross-section having a corresponding parallel face of each of correspondingly curved configuration longitudinally, the tone arm 114 being somewhat longer than the tone arm 115, and of substantially U-shaped cross-section. At one end, each of these tone arms is provided with usual pick-up means, diagrammatically shown for the two tone arms at 116 and 117. These pick-up means, as will be understood by those skilled in the art, include needles 118 and 119, respectively, or other suitable record actuatable means, and are adapted to trace the sound tracks of a record to translate the irregularities recorded therein into corresponding electrical impulses.

Each of the tone arms 114 and 115, near the end thereof opposite the pick-up means, is secured by transverse pivot means to an end of a usual mounting plate or bracket, not shown, extending from the pivot means toward the nearer end of the tone arm. Such pivot means are shown at 121 and 122 in Fig. 8. The mounting plate or bracket of the tone arm 114 intermediate its ends is fixed on and is rotatable with a post or shaft 123 extending above and below the ends of a tubular sleeve 124 encasing an intermediate portion of the post 123. The mounting plate or bracket of the tone arm 115 intermediate its ends is fixed on and is rotatable wtih the end of the sleevve 124 corresponding to that of the post 123 carrying the tone arm 114. The tone arm 115 is provided with an elongated aperture, not shown, through which the sleeve 124 extends, of sufficient size to permit pivotal movement of the tone arm about the pivot means 122. The tone arms 114 and 115 are so arranged on the corresponding ends of the coaxial post 123 and sleeve 124 that they are axially spaced with the needle of each extending or pointing in the general direction of the other.

Figure 2:
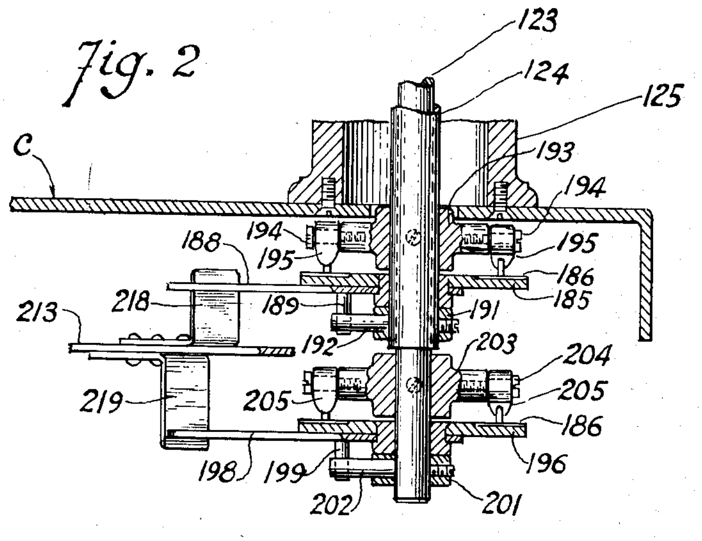
Fig. 2 is a detail vertical section of the tone arm return mechanism.

The coaxial post 123 and sleeve 124 are journaled intermediate their ends in suitable bearing means at the upper end of a bearing standard 125 secured, as shown in Fig. 2, on the panel C rearwardly of the bracket member 89 and the turntable 99, and carry the tone arm assemblies just described at their upper ends. The tone arms 114 and 115 are thus mounted near the record playing position with the tone arm 114 spaced above the tone arm 115 in such manner that the needle 118 of the upper tone arm points downwardly and the needle 119 of the lower tone arm points upwardly.

When so mounted at the upper ends of the post 123 and sleeve 124, the tone arms extend forwardly of the respective pivot means 121 and 122 through the recess 90 in the upper end of the bracket member 89 and, by reason of their curved configuration, curve laterally toward the path of the turntable 99. The length and curved configurations of the tone arms are sufficient to dispose the downwardly directed needle of the upper tone arm in overhanging relationship above the margin of the upper face of a record in playing position, and to dispose the lower pick-up means 117 outside the path of a record being moved by the turntable 99 to and from playing position and its upwardly directed needle 119 displaced laterally and below the lower face of a record in playing position.

Figure 1:
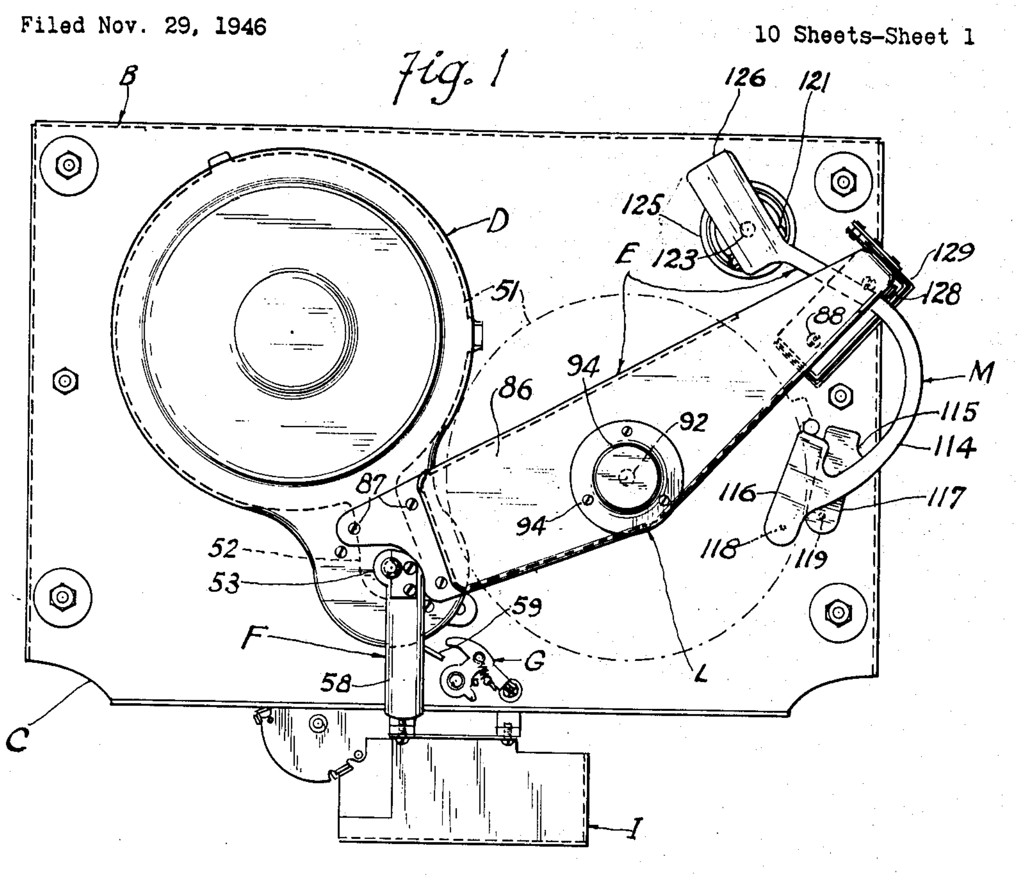
Figure 1 is a top plan view of the operating mechanism of an automatic phonograph embodying the features of the instant invention.

The tone arms, as illustrated in Figs. 1 and 8, also extend rearwardly of the respective pivot means 121 and 122. The weight of the portion, designated 126, of the upper tone arm assembly 114 rearwardly of the pivot means 121 is sufficiently less than that of the forwardly extending portion that gravity urges the latter, including the pick-up means 116, downwardly about the pivot means 121. The relative weights of the rearwardly extending portion, designated 127, and the forwardly extending portion of the lower tone arm assembly 115 are likewise different, the portion 127 having the greater weight, so that gravity urges the forwardly extending portion including the pick-up means 117 upwardly about the pivot means 122. The weight differentials between the two portions of each tone arm constitute simple means for moving the respective needles 118 and 119 about the horizontal pivot means 121 and 122 between playing and non-playing levels relative to the upper and lower faces of a record in playing position.

Figure 10:
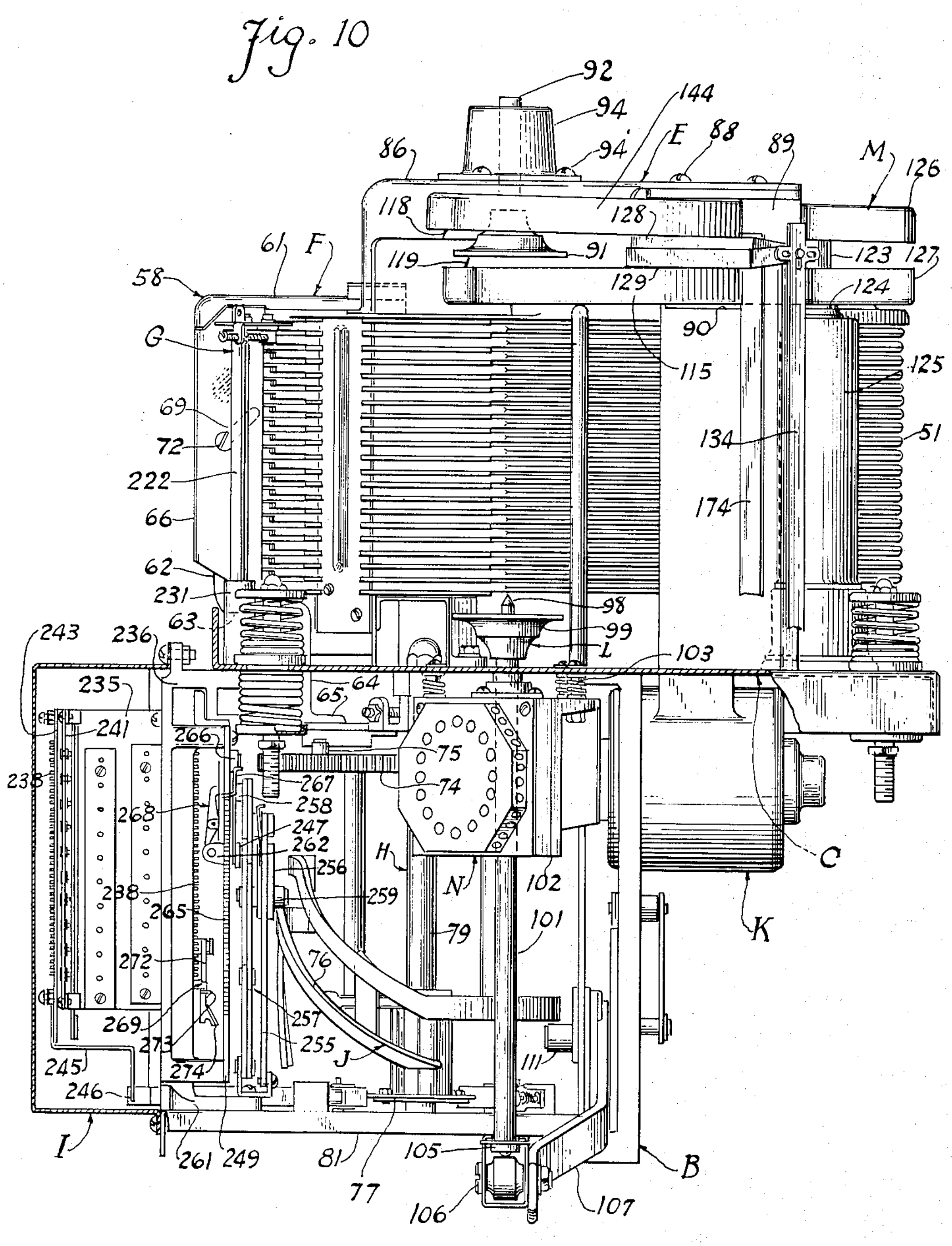
Fig. 10 is a side elevational view, with parts in section, as seen from the right of Fig. 1.
Figure 11:
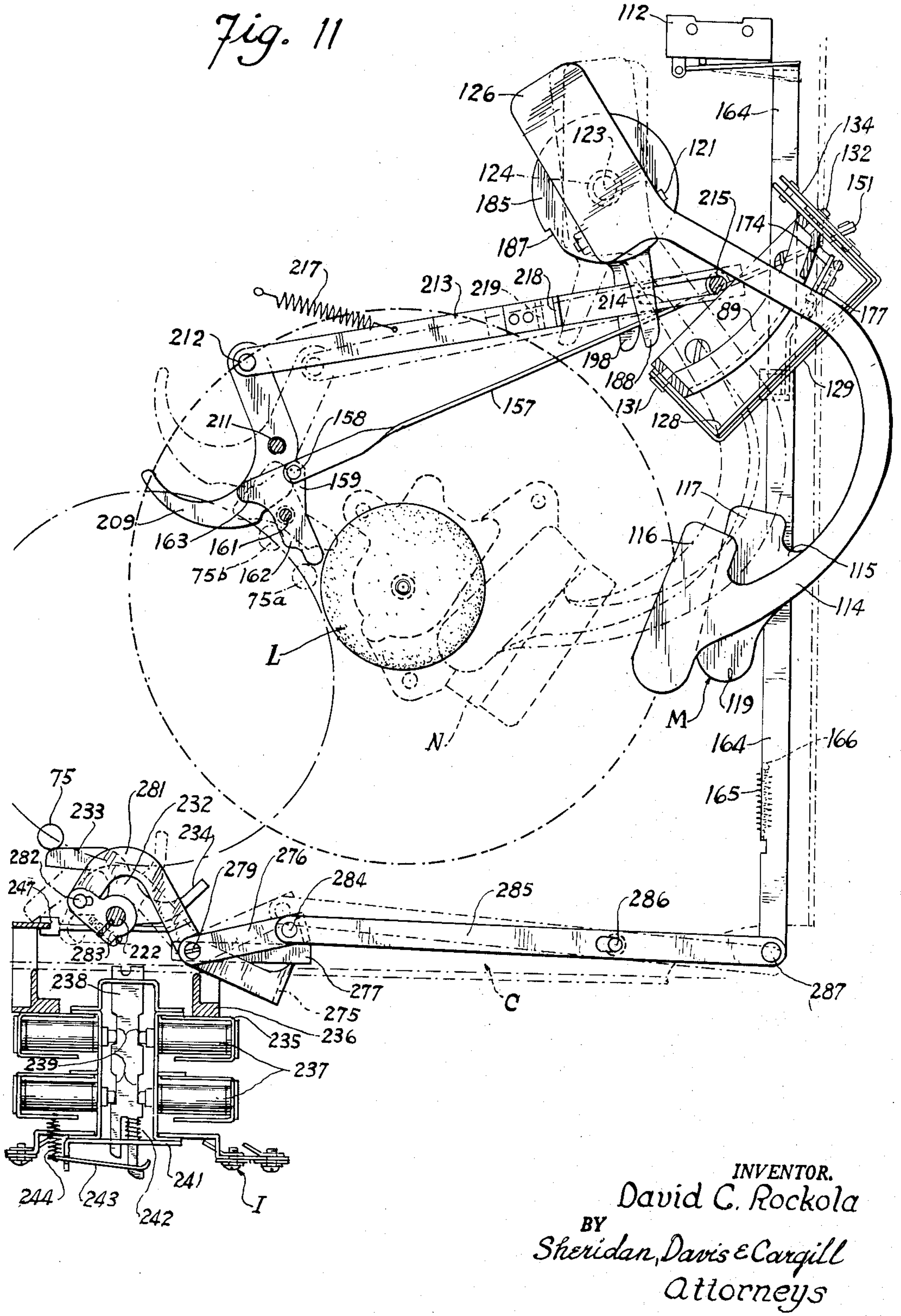
Fig. 11 is an enlarged top plan vew of part of the operating mechanism with parts thereof in horizontal section.

For releasably holding the tone arms with the upper needle 118 above and the lower needle 119 below their playing levels before playing commences, novel record reproducer or tone arm restraining means are provided which are best illustrated in Figs. 1, 10, 11 and 34 to 39. This tone arm restraining means comprises scissors mechanism including upper and lower bail members 128 and 129 disposed between the tone arms 114 and 115 adjacent the forward side of the standard 89 near the opening 90 therein. Each of the bails 128, 129 is U-shaped in longitudinal section and pivotally mounted at the inner or left end, as viewed from the front of the machine, on the standard 89 by a suitable stud bolt 131 (Figs. 11 and 34). Transversely opposite the stud 131 is a similar stud bolt 132 mounted to extend outwardly from the opposite side of the standard 89 and having slidable engagement adjacent its outer end with a slot 133 (Fig. 37) provided adjacent the upper end of a vertically disposed, longitudinally movable slide member 134. The outer legs of each of the bails 128 and 129 are also pivotally mounted upon the stud 132. The upper bail 128 is provided at the rear end of the leg pivoted on the stud 132 with a stud 135 extending outwardly therefrom through a horizontally disposed slot 136 in the rear arm of the upper, cross-shaped end of the slide member 134. On the opposite or forward side of the pivot 132, the adjacent leg of the lower bail 129 is provided with a similar stud 137 extending through and slidably engaging a horizontally disposed slot 138 in the forward arm of the upper end of the slide member 134. With this arrangement, vertical movement of the slide 134, as permitted by the bolt 132 and slot 133, will swing the bails 128, 129 between their fully open position of Fig. 36 and their fully closed position of Fig. 37. In the former position, as illustrated diagrammatically in Figs. 20 and 27, with the slide member 134 in its lowermost position, this scissors mechanism comprising the bails 128 and 129 functions to maintain the tone arms 114, 115 in their normal inoperative positions with the upper needle 118 above and the lower needle 119 below their playing levels, as illustrated in Fig. 10.

The upper surface of the upper bail 128 is provided adjacent the outer end thereof with a rectangular slot 139, best shown in Fig. 36. A similar slot 141 is provided in the lower edge of the lower bail 129 in vertical alignment with the slot 139. This lower surface of the bail 129 is also provided with an angular slot 142 having an upper surface sloping upwardly and inwardly from a point directly adjacent the inner end of the slot 141. These slots 139 and 141 normally engage the respectively adjacent lower and upper edges of the tone arms 114 and 115, as illustrated in Figs. 25 and 32, when the scissors mechanism is in its open position to restrain the tone arms against inward movement from such normal inoperative position.

Means are provided for urging the tone arms inwardly from such inoperative position to a sufficient extent to insure engagement of their respective needles 118, 119 with the playing groove of a disc record disposed in playing position upon release of the tone arms from their respective slots 139, 141 when the restraining bails 128, 129 are moved to an intermediate position (as illustrated in Fig. 38). These means, best shown in Figs. 34 and 35, comprise upper and lower leaf springs 143 and 144. The upper spring 143 is connected in any desired manner at its upper end to a retaining lug 145 formed integrally with and depending from the arm 86. The lower end of this spring 143 is in contacting engagement with the outer surface of the upper tone arm 114 to urge inward swinging movement of the tone arm about its pivot post 123. The upper end of the lower spring 144 similarly engages the outer surface of the lower tone arm 115 to urge inward swinging movement thereof on its pivot 124. As best seen in Figs. 26 and 34, the lower end of the spring 144 is rigidly connected by screws 146 to the inner surface of a retaining lug 147 formed integrally with and extending rearwardly from the main body portion of the standard 89. As will be explained later in reference to the operation of the phonograph as a whole, when a recording on the lower side of any record contained in the storage means D has been selected for playing and such record has been moved to its playing position by the record changer means F and turntable 99, downward movement of the slide member 134 to swing the bails 128, 129 from their normally fully opened, tone arm restraining position of Fig. 36 to the intermediate position of Fig. 38 will enable the lower tone arm 115 to be swung inwardly about its pivot 124 by the spring 144 into a position wherein the upper outer edge of the tone arm is engaged by the inner end of the slot 142 of the lower bail 129. Such inward swinging of the lower tone arm by the spring 144 is accompanied by upward movement of the forward end of the tone arm about its pivot 122 in response to the counter-balancing effect of its rearwardly extending portion 127.

Under such circumstances, it will be appreciated that upward movement of the lower bail 129 would normally be accompanied by a following upward movement of the forward portion of the tone arm 115, so that the slot 141 would not be removed from its normal engagement with the upper edge of the tone arm to permit the spring 144 to swing the tone arm inwardly from its inoperative position of rest. Means are therefore provided for preventing upward movement of the lower tone arm 115 directly following such upward movement of the lower bail 129, so that the tone arm will become disengaged from the slot 141 to permit the spring 144 to function in the desired manner. This means comprises a guide lug 148 (Figs. 34, 35 and 39) formed integrally with the standard 89 and extending inwardly from the outer edge thereof. The lower surface of this guide lug 148 comprises a cam surface, sloping inwardly and upwardly, which is engageable by a following roller 149 pivotally mounted interiorly of the lower tone arm 115. The roller 149 and lower cam surface of lug 148 function to prevent following upward movement of the lower tone arm 115 upon raising of the lower bail 129 from its normal tone arm restraining position of Fig. 36 to its intermediate position of Fig. 38 to enable disengagement of the tone arm from the slot 141 and inward swinging movement of the tone arm by the spring 144. During such inward swinging movement of the lower tone arm 115 by the spring 144, the rear weighted portion 127 thereof will insure engagement of the roller 149 with the lower cam surface of the guide lug 148, which results in the upper edge of the tone arm becoming engaged by the inner end of the slot 142 in the bail 129. In this position of the lower tone arm, as will be more fully appreciated hereinafter, the needle 119 will be disposed below and substantially in engagement with the playing groove on the under side of a record which has been brought into playing position.

As previously noted, the scissors mechanism comprising the bails 128, 129 is normally maintained in its opened position to engage the tone arms 114 and 115, respectively, in the slots 139 and 141 by the slide member 134 being disposed in its lowermost position. At its lower end, the slide member 134 terminates in a downward extension 151 (Figs. 6 and 11) formed integrally therewith and angularly disposed relative to the main portion of the slide 134. The lower end of the extension 151 is pivotally connected at 152 to the outer arm of a bell crank 153 in turn pivoted intermediate its ends at 154 to a bracket 155 depending from and secured in any suitable manner to the under surface of the mounting panel C. The other arm of the bell crank 153 is pivotally connected at 156 to the outer end of a link 157. The inner end of the link 157 is pivotally connected at 158 to a cam 159 in turn pivotally connected at 161 to the mounting panel C. These several parts are normally in their full line positions of Figs. 6 and 11 with the slide member 134 and its extension 151 in their bottom position. Counter-clockwise rotation of the cam 159 about its pivot 161, as viewed from above in Fig. 11, will move the link 157 to the left in Fig. 11 and to the right in Fig. 6 to swing the outer end of the bell crank 153 upwardly to raise the extension 151 and slide member 134. Such movement of the cam 159 is accomplished by the pin or stud 75 which is mounted on the upper end of the master cam J for cyclically operating the selector means G. During a cycle of operation of the machine, the master cam J is rotated in a counterclockwise direction, as viewed from above, to cause a selected record to be carried from the record storage means D into playing position in which it is clamped between the turntable 99 and the clamping disc 91. The stud 75 is moved during such operation of the master cam from its full line position in Fig. 11 to its broken line position of 75*a* therein where it first comes in contact with the cam 159. Continued rotation of the master cam then causes the stud 75 to swing the cam 159 in a counter-clockwise direction about its pivot 161. Such movement of the cam 159 is in two seperate but continuous steps by virtue of a rise 162 provided thereon. Contact of stud 75 with the forward end of cam 159 results in an initial upward movement of the slide member 134 from its normal position of Fig. 36 to that of Fig. 38 to bring the scissors mechanism 128, 129 to its previously described intermediate position. This operation of the cam 159 is followed after a very short dwell by further counter-clockwise swinging thereof by the stud 75 passing the rise 162 provided on the cam to raise the slide member 134 to its upper-most position of Figs. 21, 29 and 37 to fully collapse the scissors mechanism 128, 129. At this point during each cycle of operation with the stud 75 in its broken line position of 75*b* in Fig. 11, the master cam J is stopped, and it remains stationary throughout the playing portion of the cycle.

Upon completion of the playing of the selected record, rotation of the master cam is again initiated and the stud 75 contacts a rise 163 on the cam 159 to swing the latter in a clockwise direction about its pivot 161 from its broken line position back to its full line position of Fig. 11. Such movement of the cam 159 through the linkage comprising the member 157, bell crank 153 and extension 151 lowers the slide member 134 to its normal position of Fig. 36 to reopen the scissors mechanism 128, 129.

From the above, it will be seen that closing of the scissors mechanism, comprising the bails 128, 129, would release both the upper and lower tone arms 114 and 115 for inward swinging movement by their respective springs 143 and 144. During any one playing cycle, however, it is obvious that only one of these tone arms is desired to be moved into playing engagement with the selected record. Consequently, means are provided under the control of the predetermining or selector control means I and operative in accordance with the setting thereof to determine whether the upper or lower tone arm will be released upon closing of the scissors mechanism. This means includes a horizontally extending slide 164 (Figs. 7 and 11) which is mounted below the panel C and is normally held in its rearmost position, as shown in full lines in Fig. 11, by a spring 165 connected at its forward end thereto and at its rear end to a pin 166 mounted in the panel C. As best seen in Fig. 7, the slide 164 is provided intermediate its ends with an upstanding ear 167 formed integrally therewith and pivotally connected at 168 to the lower end of a bell crank 169. The bell crank 169 is pivotally mounted at 171 on a bracket 172 depending from and secured in any suitable manner to the mounting panel C. The other arm of the bell crank is pivotally connected at 173 to the lower end of a vertical slide member 174 which extends upwardly through a suitable aperture in the mounting panel C. During each cycle of operation of the machine, if the particular recording which has been selected for playing is on the lower surface of one of the record discs, the slide 164 is moved forwardly against the action of its spring 165 to its broken line position of Fig. 11, in a manner to be described in detail hereinafter. Such forward movement of the slide 164, since it comprises movement thereof to the left in Fig. 7, will result in raising of the vertical slide member 174 through the agency of the bell crank 169.

The vertical slide member 174 extends upwardly adjacent the forward, outer surface of the standard 89 and is provided adjacent its upper end with a slot 175 slidably engaging a stud pin 176 which is secured to the standard 89. As best seen in Figs. 25, 26, 32 and 33, the upper end of the vertical slide 174 is provided with a pair of latch pawls 177 and 178 pivotally mounted thereon at 179 and 181, respectively. The pivots 179 and 181 are disposed inwardly of the stud pin 176, and the outer ends of the latch pawls 177 and 178 are inter-connected by a coil spring 182. In the lower or normal position of the vertical slide member 174, the lower pawl 178 engages the outer wall of the lower tone arm 115, as shown in Figs. 25 and 26, to prevent inward swinging movement of the lower tone arm by its spring 144 when the scissors mechanism 128, 129 is collapsed. In this position of the slide 174, the upper latch pawl 177 is inoperative. Whenever a recording is to be played which is on the underside of its disc record, the selection thereof and movement of the record to playing position includes a forward movement of the horizontal slide 164, in a manner to be later described, to raise the vertical slide 174 to its upper position of Figs. 32 and 33. In this latter position, the upper latch pawl 177 engages the outer leg of the upper tone arm 114 to prevent inward swinging movement thereof by the spring 143 upon collapsing of the scissors mechanism 128, 129. In this position of the slide 174, the lower latch 178 is inoperative. The pivotal mounting of the pawls 177, 178 and their inter-connection by their spring 182 permits camming of the inner end portions thereof by their associated tone arm when the latter is returned to normal or inactive position. Adjacent the inner end of each of the pawls 177 and 178, there are provided inward extensions 183 from the upper end of the vertical slide member 174 for cooperation with rearwardly extending ears 184 formed integrally with each of the pawls 177 and 178. The extensions 183 and ears 184 thus limit pivotal movement of the latches 177 and 178 by the spring 182, in a clockwise direction in the case of pawl 177 and a counter-clockwise direction in the case of pawl 178, as viewed from the front of the machine.

Means are provided for returning either of the tone arms 114 or 115 to their normal inactive position, upon completion of the playing of a selected record, which are substantially identical to that provided for the same purpose in Patent No. 2,159,833 previously referred to. As shown in Fig. 2, such means are duplicated for each of the two tone arms herein provided. Below the mounting panel C, the tubular sleeve 124, which is secured at its upper end to the lower tone arm 115, is provided with a disc 185 loosely mounted thereon. The disc 185 is provided with an annular serrated portion 186 on its upper surface, a notch 187 on its periphery (Fig. 11), a radially outwardly extending arm 188, and a depending lug or stud 189. The disc is held on the lower end of the tubular sleeve 124 by a retaining ring 191 secured in any suitable manner to the sleeve and having a projection 192 extending radially therefrom sufficiently to engage the depending stud 189 for a purpose appearing more fully hereinafter. A driving member 193 having diametrically opposed arms is rigidly secured in any suitable manner to the sleeve 124 above the disc 185 which cooperates with the retaining ring 191 to prevent movement of the disc 185 axially of the sleeve. The driving member 193 has pivotally mounted on the outer ends of its opposed arms, by means of shouldered stud bolts 194, a pair of pawls 195 terminating at their lower ends in knife-edge portions offset laterally from the vertical plane through the axes of the bolts 194 and engageable by the action of gravity with the serrated portion 186 of the disc 185.

Similar mechanism is provided for the upper tone arm 114 which comprises a disc 196 loosely mounted upon the lower end of the shaft 123, which shaft is secured at its upper end to the upper tone arm 114. The disc 196 is provided with an annular serrated portion 186 similar to that of the disc 185, a notch 197 in its outer periphery (Fig. 3), a radially outwardly extending arm 198, and a depending stud 199. A retaining ring 201 is secured in any suitable manner to the lower end of the shaft 123 below the disc 196 and is provided with a projection 202 extending radially therefrom a sufficient distance to engage the depending stud 199. A driving member 203 similar in all respects to the driving member 193 is rigidly secured in any suitable manner to the shaft 123 above the disc 196 and cooperates with the retaining member 201 to prevent movement of the disc 196 axially of the shaft 123. This driving member 203 is provided at the ends of its opposed arms by means of shouldered stud bolts 204 with a pair of depending pawls 205 similar to the pawls 195.

The arrangement of the driving members 193, 203 and their pawls 195, 205 is such that when they rotate in one direction with their respective tone arms, as caused by the tone arms swinging from a starting position toward the center of the record being played, the knife-edges on the pawls have driving engagement with the serrated portions 186 of the respective discs 185 or 196, but when the driving members rotate in the other direction (the direction caused by their tone arms returning to starting position) the knife-edges of the pawls 195 or 205 have sliding engagement with their serrated portions 186. Thus, as either of the tone arms swings under the action of the record being played toward the central portion thereof, the projection 192 or 202, depending upon which tone arm is being operated, swinging with the tone arm through the agency of the hollow sleeve 124 or the shaft 123, drivingly engages the associated depending stud 189 or 199; and the knife-edges of the pawls 195 or 205 drivingly engage the serrated portion 186, thereby causing either the disc 185 or the disc 196 to rotate with the inswinging or playing tone arm. If the record is of the type which terminates with a circular groove, the driving engagement just described rotates either the disc 185 or 196 until the needle of the tone arm reaches the circular groove. If the record terminates with an eccentric groove, upon completion of playing the tone arm is caused to oscillate. These oscillations of the tone arm are transmitted by the hollow sleeve 124 to the driving member 193 or by the shaft 123 to the driving member 203. When either of the tone arms during such oscillations is moved toward the center of the record, the knife-edges of the pawls 195 or 205 coacting with the serrated portion 186 rotate the disc 185 or 196, and when the tone arms are moved in the opposite direction, these knife-edges slide over the serrated portions 186, the net result being rotation of either the disc 185 or the disc 196 intermittently a distance depending upon the throw of the eccentric finishing groove of the record.

Either such described action at the end of playing of a record by the tone arm 114 or the tone arm 115 will result in the notches 197 or 187 of their respective discs 196 or 185 being brought into alignment with the forward end of associated spring-urged switch arms 206 or 207 (Figs. 3 and 40) to permit closing of one or the other portion of a dual switch mechanism indicated generally by reference numeral 208. Such closing of either side of the dual switch 208 results in re-energizing of the motor K for driving the master cam J, in a manner more fully described hereinafter, to again start the master cam rotating from its position of rest which it assumed during the playing of the record and in which the stud 75 was in its position indicated at 75_b_ in Fig. 11.

Movement of the stud 75 from this intermediate position of rest first opens the scissors mechanism 128, 129, in the manner previously described, through the agency of the cam 159 to move the tone arm 114 or 115 vertically out of engagement with the record just played, and then functions to return whichever of these tone arms was just played to its initial or inactive position. The means for accomplishing this return movement of the tone arm includes a cam 209 (Fig. 11) pivotally mounted at 211 for cooperation with the stud 75. At its rear end, the cam 209 is pivotally connected at 212 to the inner end of a horizontally disposed slide member 213 having a movement limiting slot 214 adjacent its outer end cooperating with a stud pin 215 secured to the lower end of a bracket 216 (Fig. 5) mounted in any desired manner on the underside of the panel C. The slide 213 is normally yieldably held in retracted position, as shown in full lines in Fig. 11, by a spring 217 inter-connected between the slide and the mounting panel C. Intermediate its ends, as best seen in Fig. 2, the slide 213 is provided with upwardly and downwardly extending projections 218 and 219 in the form of angle pieces rigidly secured thereto in any suitable manner and disposed, respectively, in the planes of movement of the arms 188 and 198.

As best seen in Fig. 11, when either of the tone arms 114 or 115 has been moved inwardly during a playing cycle by engagement of its needle with the playing groove of the record, its respective arm 198 or 188 will have been moved from the full line positions shown therein to the broken line position, in which its inner edge is disposed vertically adjacent the projection 218. Re-energization of the driving motor of the master cam J in the manner just described causing counter-clockwise movement of the stud 75 from its broken line position 75_b_ will move the cam 209 and slide 213 from their full line to their broken line positions of Fig. 11 to return the operated tone arm to its initial or inactive position. Such outward swinging of the tone arm 114 or 115 will be guided in a horizontal plane by its associated bail 128 or 129, and the tone arm will be engaged at the end of such movement by its retaining slot 139 or 141 in said bails. As shown in Fig. 11, the projection 219 is spaced inwardly from the projection 218 the same distance as that between the inner edges of the arms 188 and 198 when the latter are in their normal or inactive full line positions. Thus with a constant movement the slide 213 imparts the different throws to the arms 188 and 198 through the projections 218 and 219, respectively, which are necessary to return the tone arms to their normal positions, the pick-up means of the lower tone arm normally being spaced outwardly from that of the upper tone arm to provide clearance for any record being raised to playing position.

Referring now to Figs. 20 to 24 inclusive, a complete cycle of operation of the upper tone arm 114 is illustrated therein. In Fig. 20, the record reproducing means M is shown in its normal inoperative position, with a record being carried upwardly by the turntable 99 from the record carrier 51 which has been selected and moved laterally into alignment with the turntable. As will also be seen from this figure, the lower tone arm 115 is disposed laterally out of the path of movement of the record as it is brought upwardly into playing position by the turntable. Fig. 21 shows the record clamped in playing position by the record support means L and the upper tone arm 114 in engagement with the playing groove in the upper surface thereof, following collapse of the scissors mechanism 128, 129 resulting from the raising of the slide member 134 in the manner hereinbefore described. Fig. 22 illustrates the position of the parts immediately following playing of the upper recording on the record, wherein the slide 134 has again been moved to its downward position to extend the scissors mechanism 128, 129, thereby raising the upper tone arm 114 out of engagement with the record. Following such release of the upper tone arm, it is swung outwardly back to normal inoperative position as shown in Fig. 23. Fig. 24 illustrates the subsequent downward movement of the turntable 99 to return the played record to its record carrier 51.

Figs. 27 to 31, inclusive, illustrate the same cycle of operation of the record reproducer means M when the recording on the lower side of a record has been selected for playing. Prior to the movement of the parts to their position of Fig. 27, as will later be explained herein in detail, vertical slide member 174 has been moved from its normal position of Figs. 25 and 26 to its upper position of Figs. 32 and 33 to permit release of the lower tone arm 115 after the selected record has been moved to playing position. Fig. 27 illustrates the upward movement of the selected record to playing position from its record carrier 51 by the turntable 99. Following clamping of the record in playing position, as illustrated in Fig. 28, the initial upward movement of the slide 134, as previously described, has brought the scissors mechanism 128, 129 to its intermediate position of Fig. 38, as shown in Fig. 28. Such movement of the scissors mechanism to this intermediate position has permitted the lower tone arm 115 to be swung to its position of Figs. 28 and 33 by its spring 144. Immediately thereafter, complete collapse of the scissors mechanism 128, 129 is effected by continued lifting of the slide 134 to its uppermost position, as shown in Fig. 29, to permit engagement of the needle of the lower tone arm 115 with the playing groove on the underside of the record. Fig. 30 shows the position of this lower tone arm following playing of the bottom recording of the record and return of the slide 134 to its normal bottom position to reopen the scissors mechanism 128, 129 to disengage the lower tone arm from the record. Fig. 31 shows the position of the reproducer means following return of the lower tone arm 115 to normal position, in the manner hereinbefore described. Immediately after such return of the lower tone arm, turntable 99 is moved downwardly to return the played record to its record carrier 51.

The selector means G for releasing the latch members 56 of the record storage means D comprises a finger 221 (Figs. 17 and 18) pivotally mounted at the upper end of a selector shaft 222 by means of a retaining member 223 which is keyed to the shaft and provided with an upstanding stud 224 extending through a slot 225 of the finger for limiting relative movement therebetween. A spring 226 is connected at one end to the stud 224 and at its other end to an ear 227 extending upwardly from the finger 221. The outer end of the finger 221 terminates in a downwardly extending ear 228 having a tapped aperture through which an adjusting screw 229 extends for coaction at its inner end with the lower end of the stud 224. With this arrangement, the angular position of the finger 221 on the shaft 222 may be readily adjusted and the finger will give by extension of the spring 226 in the event of accidental jamming of a latch 56.

The finger 221 is normally disposed above the topmost latch 56 and is adapted to be carried downwardly by lowering of the shaft 222 into horizontal alignment with the uppermost record selected for playing by the predetermining or selector control means. To enable such vertical movement of the finger 221, the selector shaft 222 is journaled at 231. Upon being arrested at the proper selected position, the shaft 222 is rotated in a counter-clockwise direction, as viewed from above, to effect the release of the latch 56 of the record carrier 51 containing the selected record in the manner previously described, and is then swung back to its normal position of Fig. 17. To accomplish such oscillation of the shaft 222, a key-way is provided therein for cooperation with a cam lever 232 (Figs. 11 and 12) which is secured against reciprocable movement of the shaft at a level just below the journal 231. The cam lever 232 is disposed in the path of movement of the stud 75 on the master cam J, as shown in Fig. 11, being provided with a cam surface 233 which is engageable by the stud 75 for rotating the selector shaft 222 in a direction to cause the selector finger 221 to release one of the latch members 56. The cam lever 232 also has a cam surface 234 contiguous with the cam surface 233 for permitting and controlling the rotation of the cam lever and the selector shaft in the opposite direction as the stud 75 moves therepast.

The operation of the selector means G to determine which of the latches 56 of the several record carriers 51 are to be operated in the manner previously described is controlled by the pre-determining or selector control means I. In the main, this selector control means is substantially identical to that disclosed in Patent No. 2,347,995 and my copending application Serial No. 553,161 previously referred to, in that it incorporates an electro-magnetic control means having twice the number of coils as that of said patent, and the selector detent mechanism of said application for preventing selection of later predetermined records until the selection of all previously predetermined records has been accomplished, together with additional mechanism effective to predetermine the direction of rotation of the turntable 99 and selective operation of either the top or bottom tone arm 114 or 115 in accordance with whether the selected recording is on the upper or lower surface of its record.

Figures 12, 14:
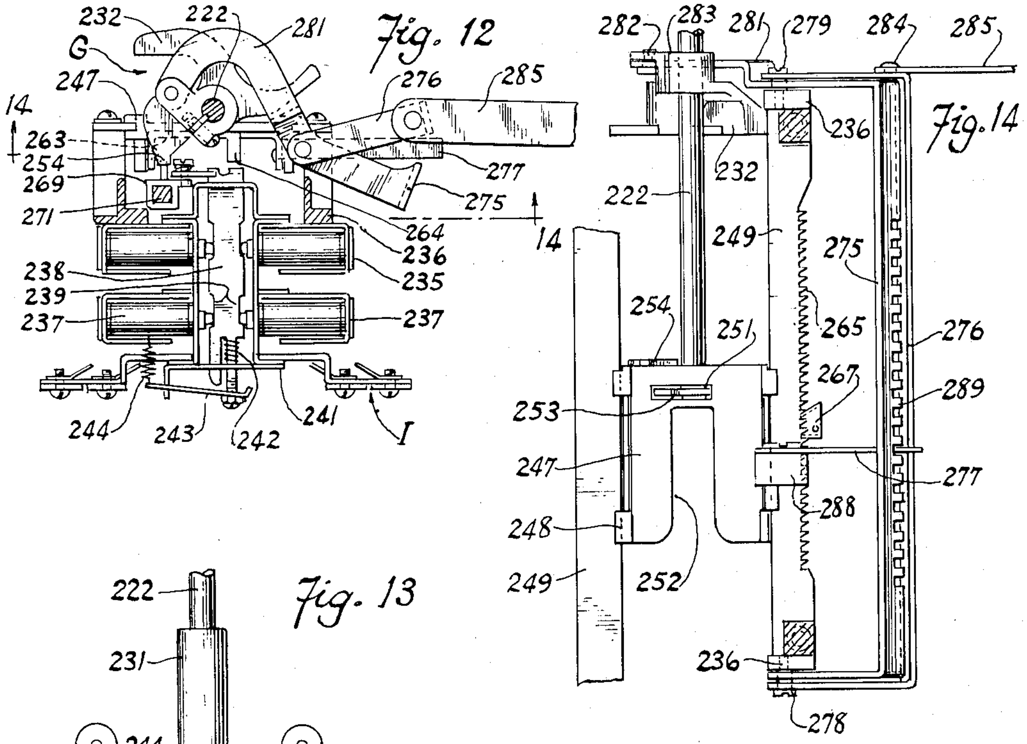
Fig. 12 is a detail horizontal sectional view of the predetermining means and part of the selector means.
Fig. 14 is a detail elevational view of part of the selector mechanism.
Figure 13:
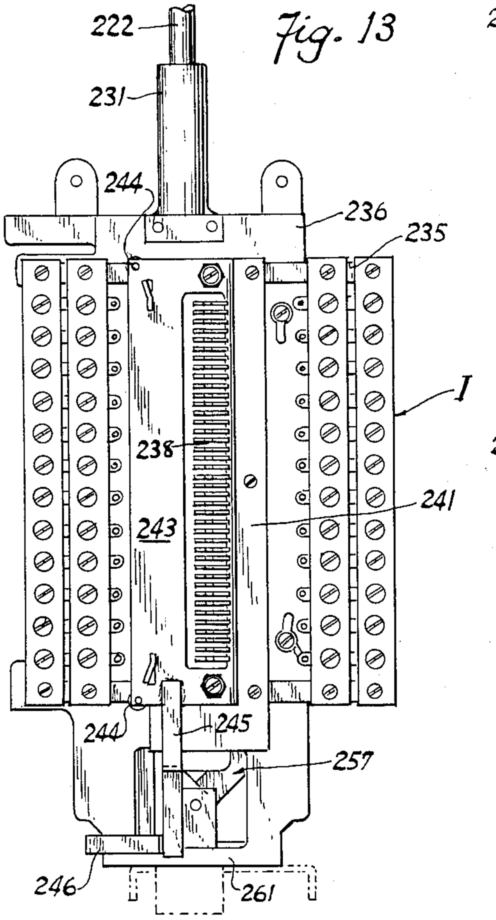
Fig. 13 is a front elevation of the predetermining means.
Figure 15:
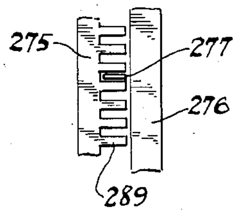
Figs. 15 and 16 are detail side elevational views of part of the selector means.

The electro-magnetic selector control means comprising the predetermining means I is shown in Figs. 10 to 16 as including a suitable supporting frame 235 mounted in any desired manner upon a frame 236 of the selector means G. The frame 235 supports a plurality of electro-magnetic coils 237 arranged in two opposed pairs of two vertical rows each. In each of these pairs of vertical rows at one side of the supporting frame, the adjacent coils 237 in the two rows are spaced vertically from each other, and adjacent coils of the opposite pairs of vertical rows thereof are similarly spaced and also vertically displaced in relation thereto. With such arrangement, the cores of each of these electro-magnetic coils are disposed respectively in horizontal alignment with one of a plurality of selector stops or slides 238 arranged in a vertical row between the two pairs of vertical rows of coils. Each of the selector stops 238 is of the same configuration, as seen in Figs. 11 and 12, and is provided with four similar indentations or notches 239, one of which is engageable with the core of its associated coil 237 so as normally to retain the slide or stop 238 forwardly out of the path of movement of the selector mechanism G. At its forward end, each slide 238 extends through a suitable aperture in a plate 241 and is provided with a spring 242 interposed between a suitable shoulder on the slide and the plate 241 for urging the slide rearwardly. This forward end of each slide 238 also extends through a suitable aperture in a switch actuating plate 243 and is bent laterally to engage the forward surface thereof. The switch actuating plate 243 is hingedly supported on the plate 241, spring urged to its forward position of Fig. 12 by springs 244, and carries a depending switch actuating lever 245 at its lower end (Figs. 10 and 13). The lever 245 extends rearwardly below the plate 243 and terminates in a depending portion having lateral engagement with the forward end of a switch actuating lever 246 which extends rearwardly adjacent the left side of the selector frame 236, is mounted on a vertical pivot and spring-urged into engagement with the lever 245, and functions to close a micro-switch for a purpose to be described hereinafter.

It will be readily understood by anyone skilled in the art of the prior patent and application above referred to that the electro-magnetic coils 237 may be selectively energized under the control of suitable push buttons 240 (Fig. 19), or the like, provided at the front of the phonograph or from control means disposed at any desired points remote therefrom. Energization of any of the coils 237 causes its core to be removed from the notch 239 in the associated slide or selector stop 238 to permit the latter to be moved rearwardly by its spring 242 into a position for cooperation with the selector means G. Such rearward movement of the slides 238 will overcome the action of the springs 244 to swing the switch actuating plate 243 in a counter-clockwise direction (as seen from above) to cause the lever 245 to swing the outer end of lever 246 to the left, as viewed from the front of the machine. The predetermining means I thus functions to position selected stops 238 in the path of movement of the selector means G to predetermine which of the records contained in the carriers 51 and which of the recordings on the two sides thereof are to be played and the order in which the selected recordings are to be played.

The selector means G includes a reciprocable plate-like slide member 247 similar to that disclosed in my copending application Serial No. 553,161, which is provided with a plurality of bifurcated lugs 248 (Fig. 14) at its opposite side edges for slidably engaging the opposite faces of each of a pair of spaced guide rails 249 suitably secured to the selector frame 236 (Fig. 10). As shown in Fig. 14, the slide member 247 is provided with a rectangular aperture 251 and a slot 252 therebelow extending longitudinally of the slide member through the lower end thereof. The slide 247 is journaled upon the lower end of the selector shaft 222, which is provided with an arm 253 fixed on the lower end thereof and adapted to be swung rearwardly through the aperture 251. A retaining angle member 254 is mounted on the upper end of the slide 247 to facilitate rotatably securing the selector shaft to the slide member and is provided with a forwardly extending arm (Fig. 12) for cooperation with the selector detent in a manner to be later described to stop downward movement of the selector G in desired predetermined record selecting positions.

A pair of vertical guide rails 255 (Fig. 10) are secured in parallel spaced relationship rearwardly of the guide rails 249 and have arranged therebetween a slidable block 256 having guide-ways at its opposite lateral faces for sliding engagement therewith. The slidable block 256 is connected at its forward face to an intermediate longitudinally center pivot of a lazy-tong linkage 257, the upper end of which is provided with a forwardly extending pivot pin 258. At its rear face, the slidable block 256 carries a cam roller or follower 259 adapted to cooperate with the cam means 76 of the master cam J for raising the slidable block to extend the linkage 257 and for lowering the slidable block to collapse the linkage 257.

When the slidable block 256 is thus raised, the forwardly extending pin 258 at the upper end of the linkage 257 and a roller carried thereby are elevated, the pin moving upwardly in the slot 252 of the slide member 247 and the roller moving upwardly along a path rearwardly adjacent the slide member. In so moving upwardly, this roller engages the face portion of the retaining angle member 254 to elevate the slide member 247 and with it the selector shaft 222. When the slidable block 256 is lowered by the cam J, the linkage 257 is collapsed to lower the pin 258 and its associated roller. Under certain conditions that causes the lowering of the slide member 247 and the shaft 222 under the control of the master cam J. The throw of the cam means 76 of the master cam J for thus reciprocating the selector shaft 222 is such that the selector finger 221 at the beginning of any playing cycle may be lowered from its normal position above the lever 59 of the upper-most latch member 56 to a position opposite the lever of the lower-most latch member 56 and returned at the end of that playing cycle to its elevated initial position. The selector finger 221 is limited in its downward movement to a position for operating the lower-most latch member 56 by engagement of the lower end of the slide member 247 on a horizontally extending portion 261 of the selector frame 236.

The slide member 247 is provided at its lower end with a pair of spaced lugs 262 (Fig. 10) extending forwardly from opposite sides of its forward face and having pivotally secured thereto a plate 263 (Fig. 12) extending upwardly adjacent the forward face of the slide member to its upper end and having a longitudinally open ended slot similar to the slot 252 in the slide member. The plate 263 is spring-urged rearwardly against the slide member 247 from which position it is swung forwardly by the arm 253 on the selector shaft 222 when the latter is rotated to effect selection in the manner previously described.

In swinging forwardly, the pivoted plate 263 carries with it a forwardly extending lug 264 formed integrally therewith at its upper end for returning the particular record predetermining element 238 which caused the selecting mechanism to stop in a selected position. The forward swinging of the pivoted plate 263 also actuates means for supporting the selector shaft at any selected elevation after the return of the record predetermining element or slide 238 which caused the selecting mechanism to stop in a selected position. For that purpose, the right-hand guide rail 249 is formed with a rack 265 (Figs. 10 and 14) along its outer edge opposite that slidably engaged by the slide member 247 and is provided at its upper end with a cam roller 266 secured to the rear face of the guide rail above the rack teeth.

Cooperating with the rack 265 is a rockable pawl 267 which is pivotally mounted on the slide member 247 and spring urged inwardly toward engagement with the rack. The pawl 267 is normally held out of engagement with the rack 265 by a spring urged lever 268 (Fig. 10) mounted on the plate 263 and having an upper end extending rearwardly through suitable apertures in the plate 263 and the slide 247 for engagement with the inner edge of the pawl 267. The lever 268 thus releasably holds the pawl 267 out of engagement with the rack 265 when, during elevation of the selector shaft assembly, the upper end of the pawl engages the cam roller 266 to cause the pawl to be swung outwardly to its disengaged position, and until the descent of the selecting mechanism to a selected position.

During such vertical movements of the selector shaft assembly, the forwardly projecting finger on the retaining member 254 (Fig. 12) moves up and down along a path at one side of the vertically aligned predetermining slides 238 and cooperates with a selector detent indicated generally by reference numeral 269 which is similar to that disclosed in my copending application Serial No. 553,161 previously referred to, for stopping the selector finger 221 in the record selecting positions predetermined by operation of the electro-magnetic coils 237. The selector detent 269 comprises a main body portion having vertical apertures therethrough slidably engaging a square shaft or rod 271 to guide vertical movements of the detent. As best seen in Fig. 10, this selector detent 269 includes a laterally swingable pawl 272 pivotally mounted thereon at its upper end and spring-urged inwardly at its lower end for cooperation with the rear ends of the slide members 238, a rearwardly extending lug 273 disposed in the path of movement of the forwardly extending projection on the retaining member 254, and a depending pawl 274 pivotally connected at its upper end thereto, normally urged by gravity to swing forwardly at its lower end out of the path of movement of the pin 258 of the lazy-tong linkage 257, and held forwardly in the path of movement of the pin 258 in the lowermost position of the detent 269 illustrated in Fig. 10 by a suitable cam roller (not shown) mounted on the rod 271. This pawl 274 is also mounted for pivotal movement on a vertical axis and spring-urged to its normal position of Fig. 10 to permit clearance between it and the pin 258 as the latter passes downwardly therepast. Upward movement of the pin 258 from a point below the detent 269, when the latter is in this lowermost position, will, through engagement of the pawl 274 by the pin 258, carry the detent upwardly with the selector shaft assembly. In any other vertical position of the detent 269, however, upward movement of the pin 258 from a point therebelow will clear the pawl 274.

In operation, initially the record carriers 51 are in stack or column relationship at one side of the turntable 99, and the master cam J by engagement with the roller 259 is holding the lazy-tong linkage 257 in its extended position. In that position, the roller on the pin 258 by engagement under the retaining angle member 254 supports the selector shaft assembly in its elevated or uppermost position. The ensuing rotation of the master cam J, upon initiation of a cycle of operation, causes the lowering of the selector shaft assembly, which will continue to its lowermost position if the selector detent 269 is in its lowermost position of Fig. 10. The selector detent 269 will initially be in its uppermost position and resting upon the pin 258 if the last record predetermined in the preceding playing cycle was the record in the lowermost record carrier 51, or if during the last playing cycle the selector detent descended to its lowermost position upon selection of the record to be played in that playing cycle, in which event, after the playing of the selected record, the selector detent 269 will be elevated to its uppermost position by the pin 258 before operation of the phonograph is stopped.

If, while the selector detent and the selecting shaft assembly are in these upper positions just described, one or more of the electro-magnetic coils 237 are energized to cause inward movement of their respective slides 238 to selecting position and operation of the phonograph is instituted, the ensuing rotation of the master cam J causes the lowering of the selector shaft assembly and the detent 269 supported thereby. This descent of the selector detent 269 is interrupted by engagement of its pawl 272 on the rear end of the uppermost predetermining slide 238 which is in rearward or selecting position. The selector shaft assembly thereafter continues its downward movement a short distance until the forward projection of the retaining member 254 engages on the lug 273 of the positioned selector detent. Such engagement interrupts the descent of the selector shaft assembly. The master cam J, however, continues to rotate and thereafter causes the lowering of the slidable block 256 to collapse the lazy-tong linkage 257, during which movement the pin 258 moves downwardly out of engagement with the pawl 274 of the selector detent 269, whereupon this pawl 274 swings into its forward position out of the path of movement of the pin 258.

When the selector detent 269 is engaged by the forward extension of the retaining member 254 to stop the selector shaft assembly, the selector finger 221 at the upper end of the shaft 222 is at the elevation of the latch 56 controlling the record carrier 51 bearing the record corresponding to the slide 238 which stopped the descent of the selector detent. In that position, as already described, selection of the record is completed by cam lug 75 acting on cam 232 to rock the selector shaft 222 about its longitudinal axis to cause the operation of the latch member 56 by the finger 221. During this rocking movement of the selector shaft 222, the arm 253 at its lower end cams the pivot plate 263 forwardly against the action of its spring which, through the agency of its lug 264, returns the predetermining slide 238 which caused the stopping of the selector detent to its forward inactive position and, at the same time, removes the upper end of the spring urged pawl 268 from engagement with the inner edge of the spring urged pawl 267 to permit the latter to move inwardly into engagement with that tooth of the rack 265 horizontally aligned therewith.

Such return of the predetermining slide 238 to its forward position permits the selector detent 269 to fall downwardly by gravity into engagement with the next lowermost slide 238 which has been moved rearwardly to active position. However, engagement of the pawl 267 with the rack 265 prevents downward following movement of the selector shaft assembly. If no lower predetermining slide 238 has been moved rearwardly to active position, the selector detent 269, upon being so released, will move downwardly until it reaches its lowermost position of Fig. 10, in which the pawl 274 thereon is moved rearwardly into the path of movement of the pin 258 as previously explained.

Meanwhile, the master cam J continues to rotate to move the selected record carrier 51 bearing the predetermined record to a position in the path of the reciprocable turntable 99 and elevates the turntable to carry the record into playing position, whereupon the proper tone arm 114 or 115 is moved into engagement with the selected record and the circuit of the motor K driving the master cam is interrupted while the record is being played. Upon completion of the playing of the predetermined record, the motor K is re-energized to continue rotation of the master cam J which causes return of the tone arm employed, lowering of the turntable 99, return of the record carrier to stack position and the extending of the lazy-tong linkage 257. In so extending the linkage 257, the selector shaft assembly is returned to its uppermost position of Fig. 10.

In moving upwardly during the extending of the lazy-tong linkage 257, the pin 258 will return the selector detent 269 to its uppermost position if the played record was the only one predetermined and in consequence thereof, the selector detent had, upon selection of the record as above described, descended to its lowermost position. If, however, more than one predetermining slide 238 had been moved to active position to predetermine more than one record, then, during such upward movement of the selector shaft assembly by the lazy-tong linkage, the selector detent 269 will be at an intermediate position determined by the next lower slide 238 with its pawl 274 disposed out of and forwardly from the path of movement of the pin 258. Therefore, when the pin 258 is moved upwardly during restoration of the selector shaft assembly to its uppermost position while the detent 269 is in any such intermediate position, the latter remains in such position. Thus, the first cycle of operation is completed and, if only one record was predetermined when the selector mechanism reaches its uppermost position as described, the phonograph is stopped. If, however, more than one record were predetermined and the selector detent 269 is in the intermediate position just described, the foregoing playing cycle is repeated relative to the record corresponding to the second or next lower slide 238 moved to active position, and such playing cycle is repeated a number of times corresponding to the value of the coins deposited, in a manner to be described hereinafter.

Since the instant invention provides for the predetermining of not only a particular record, but also the recording on either the upper or lower face thereof for playing, the uppermost two adjacent predetermining slides 238 of the row of these slides provided effect selection of the uppermost record carrier 51 in the record storage means D, the next two effect selection of the second from the top record carrier, and so on, there being twice as many predetermining slides 238 as there are record carriers 51. Also, there are the same number of teeth in the rack 265 of the selector means G as there are slides 238 in the predetermining means I. Consequently, there are two vertically adjacent positions of the selector shaft assembly, as determined by each such pair of slides 238, in which the selector finger 221 will actuate the same latch 56 of the record changer means F. This is illustrated by the full and broken line positions of the finger 221 shown in Fig. 18. In each such paired positions of the selector shaft assembly, although the same record is resultantly moved to playing position, determination must be made as to which of the tone arms 114 or 115 are to be moved into engagement with the selected record so that the proper recording thereon will be played in accordance with the previous actuation of the predetermining means I.

Means controlled by the predetermining means I and forming a part of the selector means G are provided for effecting such determination of which of the tone arms of the record reproducer means M is to be actuated. This means is operative in accordance with whether the upper or lower of each pair of predetermining slides 236 has been activated. As best shown in Figs. 11, 12 and 14, this means comprises a pair of vertically disposed bails 275 and 276 cooperating with a horizontally disposed finger 277. At their lower ends, these bails are both pivotally supported from the selector frame 236 by a suitable stud bolt 278, and at their upper end portions they are similarly pivotally mounted upon the frame 236 by a stud bolt 279. The forward bail 275 has its upper end extending rearwardly as a horizontally disposed arm 281 passing around the selector shaft 222 and pivotally connected at 282 by a pin and slot arrangement to the outer arm of an actuating member 283 keyed to the shaft 222 for rotation therewith while remaining stationary during vertical movements of the shaft. The upper arm of the bail 276 is pivotally connected at 284 to the inner end of a link 285 supported intermediate its ends from the panel C by a suitable pin and slot arrangement 286 and slide 164. The finger 277 is secured on a vertical pivot at its inner end to a lug 288 (Fig. 14) formed integrally with and extending outwardly from the selector slide member 247, forward swinging of the finger being limited by the lug 288 to its position of Fig. 12. The outer end of the finger 277 extends between the adjacent vertical edges of the bails 275 and 276.

Figure 16:
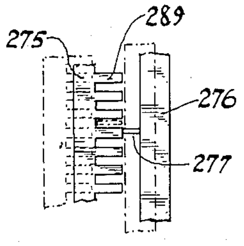

These several parts are normally disposed in their positions of Figs. 12 and 14, so that vertical movements of the selector shaft assembly and slide member 247 during operation of the phonograph, as previously described, will result in the outer end of the finger 277 moving freely up and down between the adjacent edges of the bails 275 and 276. Depending upon whether the upper or lower predetermining slide 238 of each pair of such slides effects the stopping of the selector shaft assembly in the manner previously described, the finger 277 will be disposed horizontally opposite either the space between or the inner end of one of a plurality of teeth 289 formed in the rear vertical edge of the forward bail 275. Consequently, the subsequent rotation of the selector shaft 222 effected by the cam stud 75 contacting the surface 233 of the cam 232 to cause finger 221 to release the latch 56 of the record carrier 51 associated with such activated pair of slides 238 will either not affect the position of the bail 276 or will move the same from its normal full line position to its broken line position of Fig. 11. Such two possible positions of the finger 277 corresponding to the selection of any record carried by any one of the carriers 51 are illustrated in Fig. 16 in broken and full lines, respectively. In this figure, the bails 275 and 276 are shown in broken lines in their normal positions. If the selective stopping of the downward movement of the slide 247 and finger 277 has resulted in the latter being disposed in the upper of its two possible positions, rearward swinging of the bail 275 by rocking of the selector shaft 222 will not affect the bail 276, since the finger 277 will then be disposed in horizontal alignment with the space between two of the teeth 289 on the bail 275, and these parts will then assume their positions of Fig. 15. If such stopping of the downward movement of the selector shaft assembly has resulted in the stopping of the finger 277 in the lower one of each of its two possible positions relating to each record carrier 51, however, the finger will be disposed horizontally opposite the end of one of the teeth 289, so that subsequent rearward movement of the bail 275 will be transmitted through the finger 277 to the bail 276 to move the latter to its full line position of Fig. 16 and its broken line position of Fig. 11. As will be appreciated from Fig. 11, the bail 275 will be swung rearwardly about its pivots 278, 279 each time the selector shaft 222 is rotated in a counter-clockwise direction by the cam stud 75 moving along the surface 233 of the selector cam 232. By virtue of the pin and slot connection 282 between the actuating member 283 mounted on the shaft 222 and the arm 281 of the bail 275, the initial portion of such counter-clockwise rotation of the selector shaft will not be effective to swing the bail 275, so that the previously described releasing action of the pawl 267 to permit its engagement with the adjacent tooth of the rack 265 may be effected prior to such swinging of the bail 275.

As previously described herein relative to the operation of the record reproducer means M, the slide 164 is normally disposed in its full line position of Fig. 11 to retain the vertical slide member 174 in its lowermost position so as to permit release of the upper tone arm 114 upon collapse of the scissors mechanism 128, 129 during any cycle of operation of the machine. Consequently, whenever the finger 277 is stopped in the upper one of its possible two positions corresponding to selection of a record in any one of the record carriers 51, the slide 164 will remain in such full line position of Fig. 11 to permit subsequent operation of the upper tone arm 114. Operation of the predetermining means I to effect selection of a recording on the bottom surface of any of the records carried by the several carriers 51, however, will result in the finger 277 coming to rest opposite the end of one of the teeth 289 of the bail 275, so that the subsequent rotation of the selector shaft 222 will move the bail 276, link 285 and slide 164 to their broken line positions of Fig. 11. Such movement of the slide 164 will result in the vertical slide member 174 being moved to its uppermost position, as previously described herein, to prevent operation of the upper tone arm 114 and to permit swinging of the lower tone arm 115 into cooperative relationship with the selected record upon collapse of the scissors mechanism 128, 129.

Means are provided for automatically latching the slide 164 in such forward position as soon as it is so moved thereto, and for retaining the slide 164 in such position until completion of the playing of the selected record, in each cycle of the operation of the phonograph in which the bottom recording or the recording on the under surface of any of the records is to be played. This means is best illustrated in Figs. 4, 5 and 9. As shown therein, the slide member 164 is provided at its outer edge with an upstanding lug 291 which is preferably struck from the main body portion thereof. This lug is disposed in cooperative relationship with a tooth 292 extending inwardly from the inner edge of a horizontally disposed latch lever 293 pivotally supported at its rear end at 294 in any suitable manner from the supporting panel C. A spring 295 (Fig. 4) is connected at one end to the mounting panel C and at its other end to the latch lever 293 intermediate its pivot 294 and the tooth 292 to urge the latter into engagement with the lug 291 of the slide member 164. Consequently, forward movement of the slide member 164 in the manner hereinabove described will result in the slide being held in such forward position by engagement of the tooth 292 of the latch lever 293 behind the lug 291 on the slide.

As previously stated, the slide member 164 is thus retained in its forward position by the latch 293 until playing of the selected record has been completed. Upon completion of the playing of the record, the master cam J is again caused to rotate, in the manner previously described, and the stud 75 thereof actuates the cam 209 to move the slide member 213 outwardly against the action of its spring 217 (Fig. 11). At its outer end (Fig. 4), the slide 213 is provided with a downwardly extending pin 296 which, during such outward movement of the slide 213, contacts the forward end of latch lever 293 to swing it outwardly against the action of its spring 295 to its broken line position of Fig. 4. The tooth 292 of the latch lever is thus removed from engagement with the lug 291 of the slide member 164, so that the latter is automatically returned to its normal rearward position, as illustrated in full lines in Fig. 11, by its spring 165. As has been previously described, as soon as the cam lug 75 passes the cam 209, the spring 217 functions to return the slide 213 to its normal position, which releases the latch lever 293 to permit return thereof to normal position by its spring 295.

From the above, it will be seen that the record reproducer means M is normally conditioned for release of the upper tone arm 114 upon movement of any selected record to playing position. If the predetermining means I has been actuated to select the recording on the lower face of such record for playing, however, it will result in operation of the selector means G during the ensuing cycle of operation of the machine to move the slides 164 and 175 to effect subsequent release of the lower tone arm 115, rather than the upper tone arm. Such forward movement of the slide 164 also functions to actuate the turntable reversing switch 112 to effect rotation of the turntable motor N in a reverse direction opposite to that normally employed for playing the uppermost recording on a selected record.

Referring particularly to Fig. 40, which is a schematic wiring diagram of circuits which may be used in the instant phonograph, the electrical control features of the invention will now be described in detail. Reference numeral 297 represents any suitable source of electricity for the main circuit of the machine which may be connected as indicated in Fig. 40 to a transformer 298 of any desired characteristics for supplying lower voltage current to a secondary control circuit. Each of the several selector or predetermining buttons 240 is adapted to close an associated switch 299 connected in a suitable circuit including one of the electromagnetic coils 237. It will be understood that the same number of switches 299 are provided as there are control buttons 240 and coils 237, one operable by each button to energize an associated one of the coils.

A coin controlled switch O of well known construction is provided in a secondary circuit in series with an electromagnet 301 forming a part of an accumulator or magazine switch assembly P, whereby the deposit of a coin in a coin chute 302 will close the switch O to energize the magnet 301 in a manner well known in the art. Each energization of the magnet 301 in response to the deposit of a coin will operate a pawl 303 to actuate a ratchet 304 one step in a clockwise direction, as viewed in Fig. 40. The ratchet 304 of the accumulator mechanism is provided with a pin 305 normally maintaining a magazine switch 306 open, and such rotation of the ratchet 304 removes the pin 305 from engagement with an actuating lever of the switch 306 to permit the latter to close. In the present embodiment of the invention, however, the main circuit through the master cam operating motor K and turntable motor N is not completed by such closing of the magazine switch 306. Instead, it is necessary not only to deposit a coin or coins to effect actuation of the phonograph, but also to select one or more records for playing by energizing one or more of the predetermining selenoids 237 in the manner above described. Energization of any one of the electromagnets 237 results in outward swinging of the outer end of the switch actuating lever 246 in the manner described hereinbefore. Such movement of the lever 246 as illustrated in Fig. 40, closes a normally open control switch Q by moving a lever 307 associated therewith which normally rests in the notch 78 of the cam disc 77 to maintain the switch Q open. Closing of the two switches 306 and Q by selection of one or more records for playing and the deposit of one or more coins, in the manner above described, results in completion of the main circuit including the master cam driving motor K and the turntable motor N through a second control switch R which is normally maintained closed by the cam disc 77. A cycle of operation of the machine is thus initiated.

If a coin or coins are first deposited without selection of one or more records for playing having been made, since the control switch Q is still open, a cycle of operation of the machine will not be initiated. In order to apprise an operator of the machine of this fact under such circumstances, means are provided for drawing the same to his attention by lighting a light 308 preferably mounted in the program holding panel of the machine (Fig. 19) behind suitable attention attracting indicia, such as "Please Make Selection." The indicating light 308 is disposed in another secondary circuit in series with the out-put side of the transformer 298, the magazine switch 306 and a normally closed switch 309. Thus, when one or more coins are deposited without having made a selection of a record for playing, this circuit is completed by the resulting closing of the magazine switch 306 to energize the indicating light 308. However, when any one of the predetermining coils 237 is energized, the resulting movement of the switch actuating lever 246 to close control switch Q also opens switch 309 to break the circuit containing the indicating light 308. Consequently, this light 308 is energized only when the magazine switch 306 has been closed by the deposit of one or more coins in the coin chute 302 and the switch actuating lever 246 is in its normal position because of no selection of a record for playing having been made. It will also be appreciated from the above description that the mere making of a selection by the actuation of one or more of the control buttons 240 will not alone initiate a cycle of operation of the machine, since the magazine switch 306 will remain in its normally opened position, and whenever this switch is open no circuit through the master cam actuating motor K can be completed.

As soon as a cycle of operation has been initiated in the above described manner, the cam disc 77 functions to maintain the control switch Q closed by engagement of the periphery thereof with the free end of the lever 307, the disc 77 rotating in a clockwise direction as viewed in Fig. 40. Such cycle of operation, as previously explained herein, functions to effect operation of the selector mechanism G in accordance with the uppermost predetermining slide 238 which has been moved to active position, causes the record changer means F to move the record carrier containing this selected record into alignment with the turntable 99, causes upward movement of the latter to carry the record to playing position, and includes release of one or the other of the tone arms 114, 115 depending upon whether the upper or lower recording on the record has been pre-selected for playing. At this point in the cycle, the notch 78 of the cam disc 77 arrives opposite the actuating lever of the control switch R to permit the latter to be automatically opened, thus breaking the circuit to the master cam actuating motor K while not affecting the circuit through the turntable operating motor N.

Upon completion of the playing of the selected record, as previously described herein, the actuated tone arm 114 or 115 will move its associated disc 196 or 185 to permit movement of either the lever 206 or 207 into engagement with its associated notch 197 or 187 to close one side or the other of the double switch 208. Such closing of either side of the switch 208 will complete a circuit through the motor K to reenergize the same to again actuate the master cam J and its disc 77. Continued rotation of the latter will remove the notch 78 thereof from engagement with the free end of the actuating lever of the control switch R to return the latter to normally closed position. Also, the master cam J then functions in a manner previously described herein to return the operated tone arm 114 or 115 to its normal inoperative position and to return the played record to the record storage means D, return of the operated tone arm being accompanied by counter-clockwise movement of its associated disc 196 or 185 (as viewed in Fig. 40) to re-open the normally open double switch 208.

Immediately prior to completion of this cycle of operation, a pin 311 provided on the cam disc 77 comes into contact with the free end of a switch lever 312 to close an associated normally open switch 313 which is connected in series with an electro-magnet 314 forming a part of the accumulator mechanism P. The magnet 314 is thus energized to move a pawl 315 against the action of its spring 316. As the pin 311 clears the lever 312, the switch 313 is again opened to deenergize the subtracting magnet 314 to permit return of the pawl 315 to normal position by its spring 316. Such return movement of the pawl 315 imparts a single increment of rotation to the ratchet 304 in a reverse or counter-clockwise direction to subtract "one" from the total number of playing cycles accumulated therein by previous coin actuated operation of the adding pawl 303. If only a single coin was initially deposited to start the operation of the machine, such reverse actuation of the ratchet 304 will return its pin 305 to normal position to open the magazine switch 306, thus terminating the cycle of operation of the phonograph by breaking the circuit to the motors K and N. If additional coins were initially deposited to accumulate a greater value by actuating the adding pawl 303 more than once, however, the magazine switch 306 would not thus be opened, so that operation of the machine would continue through a plurality of cycles as determined by the extent of movement previously imparted to the ratchet 304.

If, as described hereinbefore, during any cycle of operation of the machine, the last remaining actuated predetermining slide 238 has been returned to an inoperative position during the operation of the selector mechanism G, the switch actuating plate 243 will have been returned to normal position to swing the outer end of the lever 246 to the right, as viewed from the front of the machine. However, at this point in the cycle the control switch Q is maintained closed by engagement of the free end of its lever 307 with the periphery of the cam disc 77, so that continued operation of the machine will be assured until the end of the cycle. If the cycle of operation has included the playing of the last record preselected, return of the cam disc 77 to normal position, however, will permit automatic opening of this control switch Q, so that the operating mechanism will come to rest if the accumulator P has been returned to normal position to open the magazine switch 306. If the latter condition does not obtain by virtue of coins having been deposited of greater value than the number of selections made, the resulting opening of the control switch Q while the magazine switch 306 is still closed will result not only in stopping of the machine but also in closing of the switch 309 to energize the indicating light 308. The operator of the machine therefore will be apprised of the fact that he is entitled to the playing of additional recordings and that continued operation may be effected by the making of additional selections of records for playing.

It will thus be seen that operation of the predetermining means I herein, in conjunction with the closing of the accumulator switch 306 by the deposit of one or more coins, functions not only to select those records contained in the record storage means D desired to be played and the order of their playing and to initiate one or more playing cycles, during each of which a selected record is moved from stack to playing position, played, and returned to stack position; but also functions to predetermine the direction of rotation of the turntable rotating motor N and which of the tone arms 114 or 115 will be moved into active engagement with the selected record in each such playing cycle, depending upon whether the selected recording is on the obverse or reverse side of the record. It will be understood, of course, that the invention herein disclosed may be employed in a phonograph which is not coin controlled, if desired, in which case the coin switch O, accumulator mechanism P, including the magazine switch 306, and the selection indicator light 308 would be eliminated, so that initiation of a cycle of operations would be controlled only by the switch Q from the predetermining means I.

It is thought that the invention and many of its attendant advantages will be understood from the foregoing description, and it will be apparent that various changes may be made in the form, construction and arrangement of the parts without departing from the spirit or scope of the invention or sacrificing all of its material advantages, the form hereinbefore described being merely a preferred embodiment thereof.

I claim:

1. A multi-record phonograph, comprising record-storage means for storing a plurality of disc records having sound recordings on both sides thereof in vertically spaced, horizontal positions, a reciprocable turntable, means for moving any record from said storage means into the path of movement of said turntable and back to said storage means in the plane of such record when in the storage means, means for reciprocating said turntable between a position below and a position above said storage means to carry any record so moved by said moving means to and from a common playing position above said storage means, reversible means for rotating said turntable, record-reproducer means for playing the recording on either side of any record so moved to said playing position, manually settable selector means, and means operable only in response to said selector means to determine which of the records contained in said storage means will be so moved to said playing position and which recording thereon will be played and the direction of rotation of said reversible means necessary for the playing of such recording.

2. In an automatic phonograph, record-storage means for storing in parallel relationship a plurality of disc records having sound recordings on the obverse and reverse sides thereof, a reciprocable turntable for supporting and rotating a record in playing position parallel to the records in said record-storage means, record-changer means for moving said records one at a time from said storage means into the path of movement of said turntable, means for reciprocating said turntable to deliver a record from said record-changer means into a common playing position, reciprocable selector means for controlling said record-changer means to determine which of the recordings on said records is to be played and the order of their playing, a pair of oppositely disposed record-reproducer means selectively operable independently of each other to play the recordings on opposite sides of any record in playing position, reversible means for rotating said turntable, and predetermining means selectively operable manually alone to control operation of said selector means in one direction of movement thereof only to automatically determine, in the case of each selected recording, the direction of rotation of said reversible means and which of said record-reproducer means is to be employed for playing such recording in accordance with whether the same is on the obverse or reverse side of a record.

3. In a phonograph, means for playing either side of a disc record having sound recordings on the obverse and reverse sides thereof, comprising a pair of oppositely disposed record-reproducer means normally disposed in inactive position relative to a record to be played, spring means urging said record-reproducer means into active relationship with a record to be played, releasable means normally restraining said record-reproducer means against the action of said last means, latching means engageable with one or the other of said record-reproducer means to prevent movement thereof into active engagement with the record to be played, and selectively controlled means operable to release said releasable means and to control the position of said latching means in accordance with whether the recording to be played is on the obverse or reverse side of the record.

4. In an automatic phonograph, storage means for storing a plurality of disc records having recordings on the obverse and reverse sides thereof, cyclically operable operating mechanism for moving said records one at a time from said storage means into a playing position, a pair of oppositely disposed record-reproducer means normally retained in inactive position relative to a record in said playing position, means urging said record-reproducing means respectively into active relationship with the obverse and reverse sides of a record in playing position, releasable means normally restraining said record-reproducer means against the action of said last means, latching means normally engageable with the second one of said record-reproducer means to prevent movement thereof into active engagement with the reverse side of a record in playing position and moveable by said operating mechanism into engagement with the first one of said record-reproducer means to prevent movement thereof into active engagement with the obverse side of a record in playing position, control means operable by said operating mechanism to release said releasable means at a predetermined point in the cycle of operations thereof, and selectively operable means for controlling the operation of said operating mechanism to determine which of the recordings on said records are to be played and the order of their playing and for causing said operating mechanism to move said latching means into engagement with the first one of said record-reproducer means in any cycle of operations in which the recording selected for playing therein is on the reverse side of a record.

5. In an automatic phonograph having storage means for storing a plurality of disc records having recordings on both sides thereof, and cyclically operable operating mechanism for moving said records one at a time from said storage means to a playing position; record-player means comprising two oppositely disposed, normally inactive tone arms selectively moveable independently of each other by said operating mechanism in each cycle of operation thereof into operative engagement with the opposite sides of any record so moved to playing position, predetermining means for controlling the operation of said operating mechanism and said record-player means and selectively operable to predetermine the playing of either or both recordings of one or each of any plurality of the records in said storage means in successive cycles of operation of said operating mechanism, and normally expanded scissors mechanism interposed between said tone arms to prevent movement thereof by said operating mechanism and adapted to be automatically collapsed by said operating mechanism at a predetermined point in each cycle of operation thereof.

6. In a phonograph for playing disc records having recordings on both sides thereof, record-supporting means for supporting a disc record in playing position, record-player means comprising a pair of oppositely disposed, normally inactive tone arms each mounted for independent movement in two directions and carrying pick-up means adjacent one end thereof, means for urging the pick-up end of each tone arm into operative engagement with the associated side of a record in playing position in a direction perpendicular to the plane of such record, means for urging the pick-up end of each tone arm from its normally inactive position in a direction parallel to the plane of a record in playing position, scissors mechanism interposed between said tone arms and normally expanded to engage the tone arms to maintain them in inactive position against action of both of said urging means, latching means selectively positionable in movement-restraining engagement with one or the other of said tone arms, and automatically and cyclically operable means for collapsing said scissors mechanism first to an intermediate position to permit limited movement by said urging means of the tone arm not engaged by said latching means to cause the pickup end thereof to engage the associated side of a record in playing position and then to a completely collapsed position out of engagement with said tone arms.

7. In an automatic phonograph having a plurality of swingable record carriers each carrying a disc record having sound recordings on the obverse and reverse sides thereof, a reciprocable turntable, and means for swinging said record carriers one at a time to and from the path of said turntable for delivery of records thereby to a playing position; a pair of oppositely disposed record-reproducer means selectively operable independently of each other to play the recordings on the obverse and reverse side of a record in playing position, reciprocable selector means operable in either of two positions for each said record carrier to selectively control actuation of said carrier swinging means, control means normally operative to effect operation of one of said record-reproducer means whenever said selector means is stopped in the corresponding one of said two positions for any record carrier and operable, whenever said selector means is stopped in the other of said two positions for any record carrier, to effect operation of the other of said record-reproducer means, and predetermining means selectively operable to control the stopping of said selector means to predetermine the playing of either or both recordings on one or each of any plurality of the records in said carriers.

References Cited in the file of this patent

UNITED STATES PATENTS

| | | |
|---|---|---|
| 2,002,236 | Wilcox | May 21, 1935 |
| 2,068,449 | Downs | Jan. 19, 1937 |
| 2,069,180 | Erbe | June 26, 1937 |
| 2,183,607 | Ebert et al. | Dec. 19, 1939 |
| 2,255,216 | Henry | Sept. 9, 1941 |
| 2,281,547 | Andrews | May 5, 1942 |
| 2,281,548 | Andrews | May 5, 1942 |
| 2,309,352 | Offen | Jan. 26, 1943 |
| 2,319,945 | Osborne et al. | May 25, 1943 |
| 2,323,365 | Andrews | July 6, 1943 |
| 2,339,062 | Davis et al. | Jan. 11, 1944 |
| 2,340,418 | Gabel | Feb. 1, 1944 |
| 2,348,766 | Wagner et al. | May 16, 1944 |
| 2,376,741 | Weaver | May 22, 1945 |
| 2,398,067 | Winkler | Apr. 9, 1946 |
| 2,425,974 | Winkler | Aug. 19, 1947 |
| 2,458,496 | Andrews | Jan. 11, 1949 |
| 2,506,925 | Johnson | May 9, 1950 |

FOREIGN PATENTS

| | | |
|---|---|---|
| 312,196 | Great Britain | May 21, 1929 |